(12) United States Patent
Betts et al.

(10) Patent No.: US 7,801,857 B2
(45) Date of Patent: Sep. 21, 2010

(54) IMPLICIT ROUTING IN CONTENT BASED NETWORKS

(75) Inventors: Craig Betts, Kanata (CA); David Pochopsky, Ottawa (CA); Martin Barnes, Kanata (CA); Greg Bertin, Ottawa (CA); Peter Ashton, Nepean (CA); Wayne Burwell, Ottawa (CA); Steven Buchko, Dunrobin (CA); Jonathan Bosloy, Kanata (CA); Shawn McAllister, Manotick (CA)

(73) Assignee: Solace Systems, Inc., Kanata, Ontario (CA)

( * ) Notice: Subject to any disclaimer, the term of this patent is extended or adjusted under 35 U.S.C. 154(b) by 1678 days.

(21) Appl. No.: 11/012,113

(22) Filed: Dec. 16, 2004

(65) Prior Publication Data
US 2005/0152286 A1 Jul. 14, 2005

Related U.S. Application Data

(60) Provisional application No. 60/530,615, filed on Dec. 19, 2003.

(51) Int. Cl.
G06F 17/30 (2006.01)
(52) U.S. Cl. .................................... 707/628
(58) Field of Classification Search ................ 707/628; 370/254, 255
See application file for complete search history.

(56) References Cited

U.S. PATENT DOCUMENTS

| 6,021,443 | A | 2/2000 | Bracho et al. |
| 6,091,724 | A | 7/2000 | Chandra et al. |
| 6,405,191 | B1 | 6/2002 | Bhatt et al. |
| 7,200,120 | B1* | 4/2007 | Greenberg et al. .......... 370/254 |
| 7,289,456 | B2* | 10/2007 | Gupta et al. ................ 370/254 |
| 7,685,265 | B1* | 3/2010 | Nguyen et al. .............. 709/223 |
| 2003/0099237 | A1 | 5/2003 | Mitra et al. |
| 2004/0167864 | A1* | 8/2004 | Wang et al. .................... 707/1 |
| 2004/0218525 | A1* | 11/2004 | Elie-Dit-Cosaque et al. ............. 370/223 |

OTHER PUBLICATIONS

Chand, R; Felber, P.A. "A scalable protocol for content-based routing in overlay networks" Inst. EURECOM, Sophia Antipolis, France, This paper appear in Network Computing and Applications, 2003 NCA 2003; Second IEEE International Symposium Publication Date: Apr. 16-18, 2003, On pp. 123-130.

Carzaniga, A. et al; "A Routing Scheme for Content-Based Networking"; University of Colorado, Department of Computer Science Technical Report; Jun. 2003; Boulder, Colorado, U.S.A.

(Continued)

*Primary Examiner*—Cheryl Lewis
(74) *Attorney, Agent, or Firm*—Mark & Clerk; Richard J. Mitchell

(57) ABSTRACT

In a method of managing a content-based network, which is typically XML-based, and optionally may be overlaid on an underlying network having a plurality of network elements interconnected by links, a link state protocol maintains each network element's topological view of the overlay network from the underlying network. A subscription management protocol ensures dissemination of published content within the content-based network independently of the link state protocol.

59 Claims, 11 Drawing Sheets

OTHER PUBLICATIONS

Arbouzov, Leonid et al.; "Extensible Markup Language (XML) 1.0 (Third Edition)"; Feb. 4, 2004; W3C.

Arbouzov, Leonid et al.; "Extensible Markup Language (XML) 1.1"; Apr. 15, 2004; W3C.

"Namespaces in XML 1.1"; Feb. 4, 2004; W3C.

"Namespaces in XML" World Wide Web Consortium; Jan. 14, 1999; W3C.

Chand, R. et al.; "A Scalable Protocol for Content-Based Routing in Overlay Networks"; Institut EURECOM; Sophia Antipolis, France.

"OSI IS-IS Intra-Domain Routing Protocol"; Digital Equipment Corp.; Feb. 1990.

Rekhter, Y. et al.; "A Border Gateway Protocol 4 (BGP-4)"; Mar. 1995.

Bates, T. et al.; "BGP Route Reflection An Alternative to Full Mesh IBGP"; Cisco Systems; Jun. 1996.

Moy, J.; "OSPF Version 2"; Ascend Communications, Inc.; Apr. 1998; The Internet Society.

Coltun, R.; "The OSPF Opaque LSA Option"; FORE Systems; Jul. 1998; The Internet Society.

Bates, T.; "BGP Routing Reflection- An Alternative to Full Mesh IBGP"; Apr. 2000; The Internet Society.

Bates, T. et al.: Multiprotocol Extensions for BGP-4 Jun. 2000; The Internet Society.

Chandra, R. et al.; "Capabilities Advertisement with BGP-4"; Nov. 2002; The Internet Society.

Box, D. et al.; Web Services Eventing (WS-Eventing); Aug. 2004; BEA Systems Inc.

"XML Path Language (XPATH) Version 1.0"; Nov. 16, 1999; W3C.

Snoeren, Alex C. et al.; "Mesh-Based Content Routing Usinf XML"; 18th ACM Symposium on Operating System Principles (SOSP '01); MIT Laboratory for Computer Science; Cambridge, MA, 2001.

\* cited by examiner

IMPLICIT ROUTING IN CONTENT BASED NETWORKS

CROSS REFERENCE TO RELATED APPLICATION

This application claims the benefit under 35 USC 119(e) of prior U.S. provisional application Ser. No. 60/530,615 filed Dec. 19, 2003, the contents of which are herein incorporated by reference.

FIELD OF THE INVENTION

This invention relates to content-based networks and in particular to a method of implicit routing in such networks. Implicit routing is the act of forwarding customer data based on the content, rather than via a destination address determined by the information source, and allows the providers of the data (the publishers) and the recipients of the data (the subscribers) to be decoupled from and have no knowledge of one another.

BACKGROUND OF THE INVENTION

In content-based networks, the flow of messages from senders to receivers is driven by the content of messages, rather than by explicit addresses assigned by senders and attached to the messages as in the traditional Internet. Content-based networks are suited to a variety of services, including news distribution, network intrusion detection, distributed electronic auctions and the like.

A content-based routing scheme is described in Carzaniga, M. J. Rutherford, A. L. Wolf; A routing scheme for content-based networking; Department of Computer Science, University of Colorado, June 2003, the contents of which are herein incorporated by reference.

The biggest challenge associated with content routing is scalability. The address (subscription) used for routing data in a content network is generally much larger than the IP address used in explicitly addressed networks. As a result, the memory requirement for storing all subscriptions across all routers in the network quickly becomes unattainable for an internet scale network. The other difficulty with content routing lies in efficiently disseminating traffic throughout the network without introducing cycles and without any loss of data. The routing algorithm must ensure perfect delivery and optimal bandwidth utilization.

Previous schemes for implicit or content routing do not address the requirements of scalability and robustness required for deployment in a real life carrier or enterprise network.

In "Mesh-Based Content Routing using XML", Alex C. Snoeren, Kenneth Conley, David K. Gifford, $18^{th}$ ACM Symposium on Operating System Principles (SOSP 2001), pages 160-173, a scheme is described for reliably multicasting time-critical data in mesh-based overlay networks. The technique described focuses on the use of redundant multiple paths to reassemble data content, and does not describe methods for subscription management.

In "A Scalable Protocol for Content-Based Routing in Overlay Networks", R. Chand, P. A. Felber, Institute EURO-COM Research Report Number 74-RR-03-074, Feb. 26, 2003, a protocol is described for content-based routing in overlay networks, including taking advantage of subscription aggregation to reduce the size of routing tables. The protocol is specifically designed to handle XML-based data dissemination. This prior art suffers from a number of issues that are handled by the current invention, namely: the requirement to compute subscription aggregation at each node in a network through which a subscription passes (when being added or removed), the requirement to re-compute the subscription aggregation when the network topology changes, due to a link failure or recovery or the addition or removal of a link in the overlay network. In addition, the scheme does not describe how the routing protocol is made robust in the face of lost messages. In particular, it makes the assumption that node and links do not fail. It also assumes that the number and location of producer nodes (nodes with attached publishers) is known.

In "A Routing Scheme for Content-Based Networking", Anonio Carzaniga, Matthew J. Rutherford, Alexander L. Wolf, University of Colorado, June 2003, a scheme is proposed for content-based networking in an overlay network, using two routing protocols: a broadcast routing protocol and a content routing protocol. The broadcast protocol processes topological information and maintains the forwarding state necessary to send a message from each node to every other node. This can be done using a global spanning tree (e.g. minimal spanning tree), per-source trees (e.g. shortest-path trees), or other broadcast method such as reverse path forwarding. These schemes are not described further. The content-routing scheme supports predicate-based messages only (as opposed to supporting XML messages), and supports subscription aggregation. It suffers from the same issues of the subscription aggregation having to be performed at each router that a subscription propagates to, and these calculations have to be completely re-done when the topology changes. In addition, the scheme described suffers from a number of other shortcomings: when a subscription is removed, the removal may not take effect immediately, and documents may continue to flow on paths where they are no longer needed, and an inefficient method is used to repair the routing tables on a timed basis due to the above first shortcoming. Its broadcast function also requires the property of "all-pairs path symmetry", which restricts the paths that can be taken in a given network topology.

SUMMARY OF THE INVENTION

Embodiments of the invention employ an implicit routing protocol that incorporates mechanisms for discovering network topology, reacting to link and node failures, propagating very large numbers of subscription requests, and aggregating subscription requests.

According to the present invention there is provided a method of managing a content-based network having a plurality of network elements interconnected by links, comprising maintaining each said network element's topological view of the network using a link state protocol; using a subscription management protocol to distribute subscription information in a manner that is independent of network topology; using said subscription management protocol to identify which network element or elements need a given published document; using said link state protocol to compute a path to the identified network element or elements; and forwarding said given published document over said path computed by said link state protocol; whereby redistribution of subscription information is not required as a result of a change in said network topology.

It will be understood that the term "document" in the context of this application is used in the most general sense and includes any entity containing content, for example, including multimedia content, that is capable of being published to subscribers.

An exemplary content-based network is an XML content routing network. XML is eXtensible Markup Language. Refer to "Extensible Markup Language (XML) 1.0 (Third Edition)", W3C Recommendation 04 Feb. 2004, W3C (World Wide Web consortium) and "Extensible Markup Language (XML) 1.1", W3C Recommendation 15 April 2064, W3C. The network elements are typically routers. When an overlay approach is used, the overlay network is typically an XML network overlaid onto an IP network, such as the Internet.

The XML Link State protocol (XLSP) may contain methods for discovering the complete topology of XML Routers (all nodes, links and link costs) in a content-routed network, possibly overlaid on an underlying IP network (or other types of underlying networks). This includes nodes or links added to a previously commissioned network.

The XLSP may also contain methods for detecting link and node failures, for determining the shortest path between any two nodes; for determining the optimal distribution path for a given source (publisher) and a set of receivers (subscribers) for allowing a network administrator to influence the paths and topologies by the assignment of link costs; and for scaling the XML routed network, by the creation of "tiers" and the use of "areas". Hierarchies (tiers and areas) greatly enhance network scalability; and for managing the network topology information using a soft state algorithm of refresh and age. This greatly enhances the robustness of topology management in the presence of network congestion or software implementation errors. In addition, the XLSP contains methods to handle router restarts and elimination of old information disseminated by a router into the network before the restart.

The XML Subscription Management Protocol (XSMP) contains methods to content match a document against the set of subscriptions in the network upon receipt from a publisher and to determine the local set of subscribers and the set of routers which require the document. After this initial match, the XSMP allows for a document to be forwarded from one content router to another within a routing area without the need to parse and match the document before it can be forwarded onwards.

The XML Subscription Management Protocol (XSMP) may also contain methods to utilize the topology discovered by the XLSP to determine the set of links on which to forward a document to reach the set of subscribers who wish to receive the document; to avoid routing "cycles" from forming, and methods to detect and stop routing cycles should they occur during transient or error conditions; to register and remove subscribers; to handshake with adjacent XML routers and to distribute and update subscriptions to all XML routers in the routing area; and to manage subscription entries using a soft state algorithm of refresh and age. This greatly enhances the robustness of subscription management in the presence of network congestion or software implementation errors. As a portion of the refresh algorithm, the XSMP contains a method for bandwidth compression of the subscription refresh messages.

The XSMP may also contain methods to aggregate multiple subscriptions into a single subscription entry (this enhances scalability of the XML routed network, as both protocol bandwidth and memory consumption are reduced); to manage subscribers, subscriptions and publishers in the presence of routing tiers and areas; and to allow for support of equal cost multipath.

BRIEF DESCRIPTION OF THE DRAWINGS

The invention will now be described in more detail, by way of example only, with reference to the accompanying drawings.

DETAILED DESCRIPTION OF THE PREFERRED EMBODIMENTS

Figure 1:
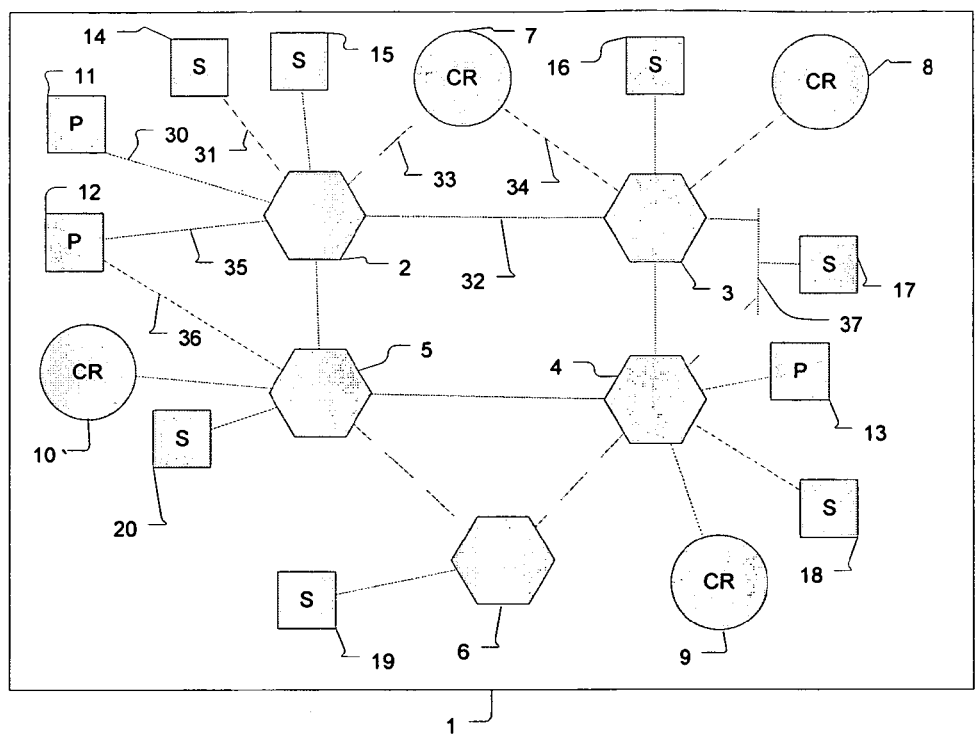
FIG. 1 is an example physical view of overlay content-routed network.

FIG. 1 shows a physical view of an exemplary content-routed network 1. The network consists of five IP routers 2, 3, 4, 5, and 6 inter-connected by physical links such as 32. Physical links can use a variety of technologies such as SONET, Ethernet, DS3, etc. as is known in the art. Attached to the IP routers are a plurality of content routers 7, 8, 9 and 10; a plurality of publishers 11, 12 and 13; and a plurality of subscribers 14, 15, 16, 17, 18, 19, and 20. Content routers, publishers and subscribers connect to the IP routers over physical links. For example, physical link 30 connects publisher 11 to IP router 2. Content routers, publishers and subscribers can also be dual-homed into the IP routed network. For example, publisher 12 connects over physical link 35 to IP router 2 and connects over physical link 36 to IP router 5; content router 7 connects over physical link 33 to IP router 2 and connects over physical link 34 to IP router 3. A content router, subscriber or publisher could also use a single physical port to connect to multiple IP routers over a shared medium. For example, subscriber 17 connects to physical link 37 that leads to both IP router 3 and IP router 4. This could be done over a shared Ethernet segment, or via an Ethernet switch or other techniques known in the art.

Figure 2:
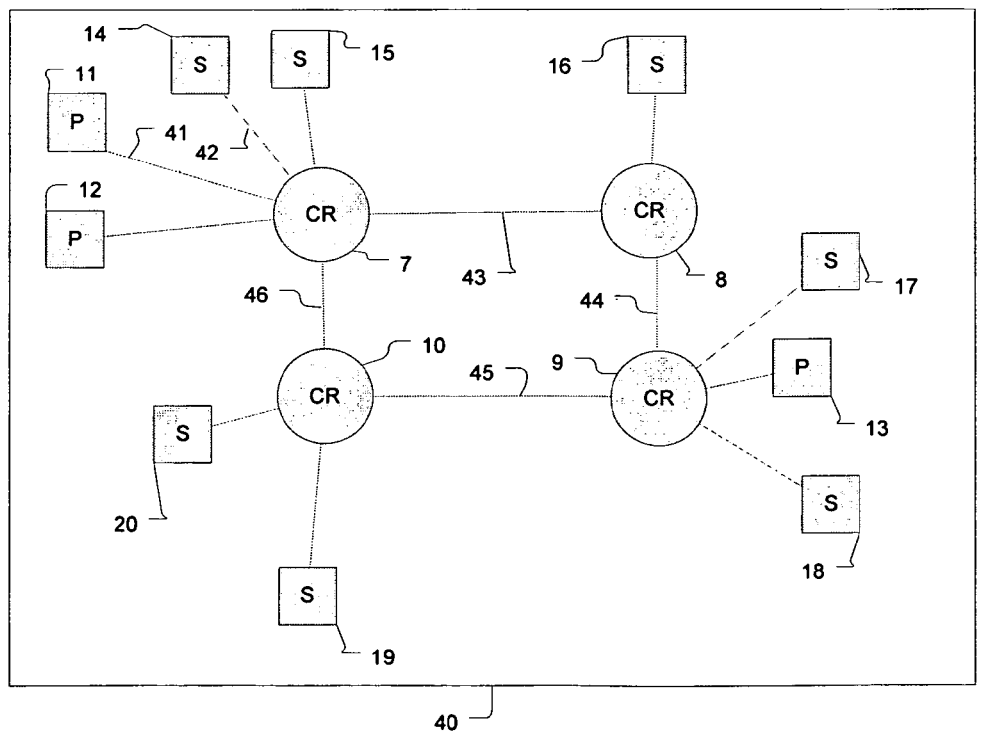
FIG. 2 is a logical view of an example XML content-routed network.

FIG. 2 shows the physical network 1 as a logical view, with content routers, publishers and subscribers sharing the same numbering as in FIG. 1. In the logical network 40, the connections between elements are preferentially done over a TCP connection running over IP. For example, publisher 11 is connected to content router 7 over TCP connection 41. Subscriber 14 is connected to content router 7 over TCP connection 42. Content router 7 is connected to content router 8 over TCP connection 43. The method in which the logical topology is formed is outside the scope of this invention. However, a simple scheme is to configure on each content router the TCP connections that it should form to other content routers in the network. Publishers and subscribers can be configured with the address of the content router to which they should connect, or can be configured with a name that is resolved to an address through a directory name service as is known in the art. The TCP connections between elements can be thought of as links in the content-routed network view.

A publisher is a computer, user or device that can insert content into the network. Another name commonly used in the literature is an event source or a producer. A publisher connects to a content router over a link and then the publisher can inject content into network 40. A subscriber is a computer, user or device that has expressed interest in some specific content. Another name commonly used in the literature is event displayers or consumers. A subscriber connects to a content router over a link and then the subscriber can receive content from the network 40.

The links between publishers and content routers (e.g. link 41), subscribers and content routers (e.g. link 42), and between content routers (e.g. link 43) preferentially use HTTP over TCP; control (i.e. XLSP and XSMP messages) and data (i.e. documents being content-routed) are multiplexed over the same HTTP connection, as described in co-filed patent application Ser. No. 60/530,678, the contents of which are herein incorporated by reference.

Note that while a content routed network is shown as an overlay to an IP network, it can also be overlayed on other technologies such as MPLS, ATM and Frame Relay networks. In addition, instead of an overlay network, content routers could be directly connected via physical links, and subscribers and publishers could directly connect to content routers over physical links. Moreover, the functionality of an IP router and a content router could be combined into a single router device. The implicit routing protocol described in this invention can function over many variations of physical networks.

Figure 3:
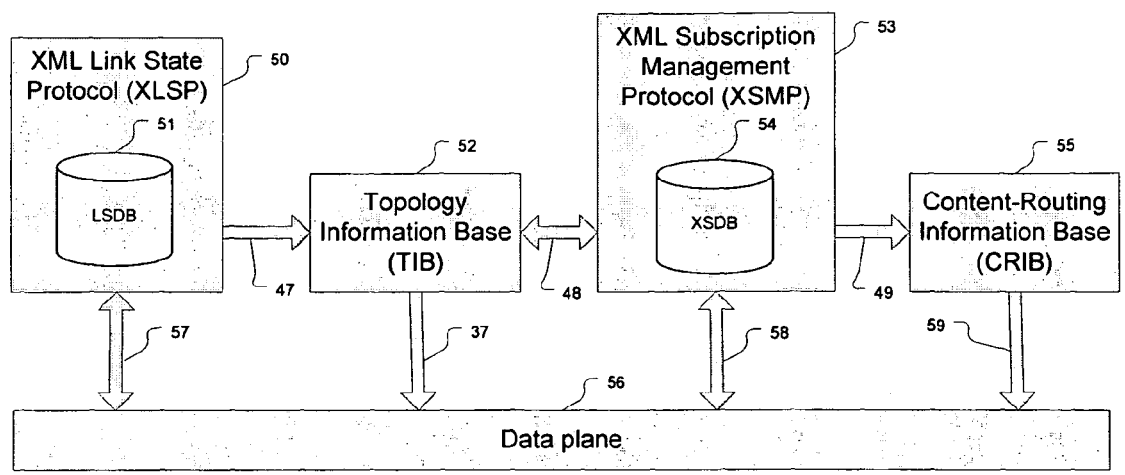
FIG. 3 shows routing control plane overview.

One embodiment of an implicit routing protocol in accordance with the principles of the invention has the following main functions, as illustrated in FIG. 3. Note that in all subsequent description, "router" refers to a content router. The XML Link State Protocol (XLSP) 50 functions like traditional link state routing protocols such as IS-IS and OSPF. The objective of XLSP is to ensure that all routers share the same view of the network's topology. The XLSP maintains the router's topological view of the XML overlay network from the underlying network layer, such as IP, or from the direct physical network if an overlay approach is not in use. For IS-IS, refer to RFC 1142, "OSI IS-IS Intra-domain Routing Protocol", February 1990, the Internet Society. For OSPF, refer to: RFC 2328, "OSPF Version 2", April 1998, The Internet Society.

Using the XLSP 50, routers stay in constant contact so that each router in the network can maintain an accurate representation of the other routers and their interconnections. The XLSP 50 stores this information in a Link State Database (LSDB) 51. Each router computes a link state value for each of its neighbors; this value is directly related to the communication cost of communicating with a specific neighbor. The cost function can be based on any number of factors; such as, bandwidth availability, throughput, latency, a cost assigned by a network administrator, etc. These link state values are communicated throughout the network allowing all routers to have a copy of the same link state database for all routers in the network. A tiered network hierarchically organizes routers so as to limit the scope of their topographical requirements. The XLSP subsystem 50 receives XLSP protocol messages (received from other routers) from the dataplane 56, and sends XLSP protocol messages to the dataplane 56 (for transmission onwards to other routers) as shown by communication path 57. The XLSP protocol messages are defined further below.

Links between routers can also be assigned other attributes that are communicated by XLSP along with the link information, and that can be used in the XLSP function. For example, links can be assigned priorities to implement quality of service in content-routed networks, as per the co-filed patent application Ser. No. 60/588,797, the contents of which are herein incorporated by reference. Other examples of attributes that can be used as part of policy-based routing include whether or not the link is encrypted (e.g. via a technique such as SSL or TLS as is known in the art), link coloring, bandwidth availability, etc.

A toplogy information base (TIB) 52 is computed by each router using the information stored it its link state database 51. Communication path 47 from the XLSP subsystem 50 to the TIB 52 indicates this information flow. In the case of policy-based routing such as with priorities, link coloring, encryption etc. multiple TIBs can be constructed. For example, a TIB can be constructed for each document priority, as described in the above-referenced filing 60/588,797. In a given router, the TIB 52 indicates which output link should be used to communicate to a given destination router ID, or in the case of equal cost multipath, can indicate more that one choice, as is known in the art.

Once the network topology is known (stored in the LSDB 51), the TIB 52 can be constructed by each router. Several techniques exist for the construction of the TIB. The preferred method is to use a shortest path calculation (such as Dijkstra's Algorithm), but other techniques such as per-source spanning tree, a global spanning tree, and reverse path forwarding can be used. All of these techniques are known in the art. The computed TIB (as a forwarding table) is sent to the dataplane 56 through communication path 37, and the dataplane uses this information in the forwarding of messages (such as XLSP messages, XSMP messages, or messages to carry content which is being content routed by the network) to other routers.

The XML Subscription Management Protocol (XSMP) 53 is a per-source content routing protocol, which means that only the ingress router receiving a document from a publisher (or the ingress router for a routing area—described later) need parse and content match the document in order for the document to be routed to all required routers in the network (or in the area where areas are used). The document is explicitly addressed to each required destination router. Each addressed router that subsequently receives the document must then parse and match the document one final time to identify and deliver the documents to all interested directly-connected subscribers. This approach is in contrast to the prior art, which requires parsing of the document at every router it passes through before the document can be forwarded onwards. The prior art also requires very complex and time consuming calculations every time the network topology changes, which the current invention avoids.

The XSMP 53 receives XSMP protocol messages (received from other routers) from the dataplane 56, and sends XSMP protocol messages to the dataplane 56 (for transmission onwards to other routers), via communication path 58. The XSMP 53 can receive topology change events from the TIB, and can query the TIB to determine information such as whether a given router is a neighbor of this router, as explained below. This is done via communication path 48.

The XSMP 53 contains a XML Subscription Database (XSDB) 54, which contains the subscription information learned from other routers in the network, as well as from locally connected subscribers. The contents of the XSDB 54 are then extracted to form a Content-Routing Information Base (CRIB) 55 via communication path 49. The CRIB 55 is sent to the dataplane 56 via communication path 59 and is used for matching documents. The use of the CRIB, and the method of matching subscriptions against XML documents, is outside the scope of this application.

Figure 18:
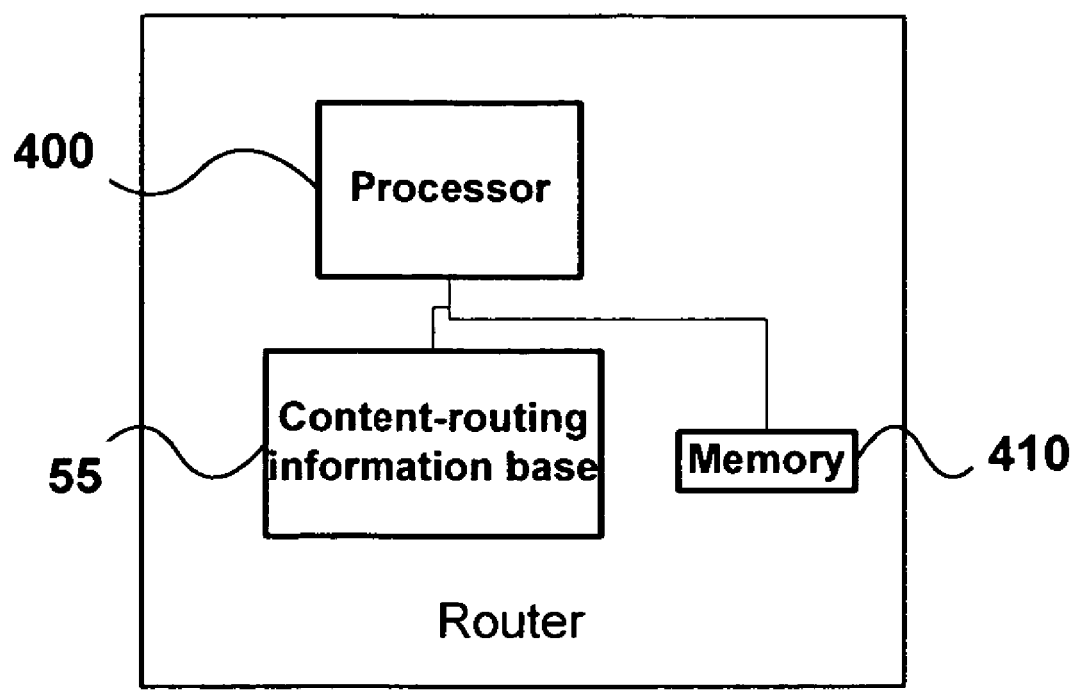
FIG. 18 is a simplified block diagram of a content router.

FIG. 18 shows a content router with a CRIB 55, processor 400 and memory 420. The processor 400 performs content matching using the CRIB and identifies egress routers requiring a received document. The processor 400 addresses the matched documents to the appropriate egress routers.

The dataplane 56 is also used by the XLSP 50 and the XSMP 53 to send and receive protocol messages to/from the network. Note that there are two different routing protocols, XLSP 50, and XSMP 53 that work together to provide content routing within a network.

XLSP 50 has the following responsibilities:
1. Neighbor acquisition and discovery
2. Compute link costs
3. Distribute it's topological view of the network
4. Identify node/link failures
5. Compute current topology graph and update the TIB
6. Reliably forward/flood new topology information learned from neighboring routers in such a manner as to ensure that all XLSP nodes have synchronized XLSP topology databases The XLSP routing protocol is request/response based. All XLSP messages require a response. The XLSP request and response messages are shown in Table 1 below.

TABLE 1

List of XLSP Messages

XLSP Messages

| Request | Response |
|---|---|
| Neighbor Acquisition Request (NAReq) | Neighbor Acquisition Response (NAResp) |
| Link State Packet (LSP) | Link State Packet Response (LSPResp) |
| Link State Database Description (LSDD) | Link State Database Description Response (LSDDResp) |
| Hello Packet (Hello) | Hello Packet Response (HelloResp) |

The preferred coding of XLSP and XSMP protocol messages is done using XML, as described in co-filed patent application Ser. No. 60/530,675, the contents of which are herein incorporated by reference. This reference also explains how the message type is indicated, how the message version number is indicated, etc. These common fields are not indicated in any of the message contents below, and are assumed to be present.

The NAReq message is sent by a router to another router which is wishes to become a neighbor with. The NAResp indicates whether the destination router accepted or rejected the neighbor request. A router may refuse a neighbor request for reasons such as: it has not been configured to accept this neighbor, if the request fails security checks, if the router already has too many neighbor relationships, maximum load exceeded, or mismatched routing levels. The contents of the NaReq message are shown in Table 2 below, and the NaResp in Table 3 below. The requestId field increases sequentially each time a new request is sent. The response returns the requestId value. This can be used by a sender on the NAReq to match a NaResp to a previously sent NaReq. The senderId is the unique ID of the router sending the message. It can be any unique identifier, such as an IPv4 or IPv6 address assigned to the router, a unique integer, etc. The priority field is the priority assigned to the router (possibly different for each link), and can be used as part of link cost calculations and router election algorithms. The level indicates the network tier the router is located in, where tier 1 is the lowest routing tier. For example, tier 1 and tier 2 could lie within an enterprise, tier 3 could be used for a local region within a carrier network, and tier 4 could be located within a carrier network and tie together all the tier 3s. Routing tiers allow a large content routed network to be constructed, and can also be used within a single administrative domain. The areaId is a unique identifier which is assigned to each routing area. This allows two different routing areas at the same routing tier level to be distinguished. A router is assumed to have failed if a hello packet has not been received within deadTime seconds.

TABLE 2

Neighbor Acquisition Request

| Field | Description |
|---|---|
| requestId | Sequential request identifier |
| senderId | The sending router's unique id |
| priority | The router's priority (1 through 4, where 1 is highest, 4 is lowest) |
| level | The tier level to which the router belongs |
| areaId | The unique id of the routing area to which the router belongs |
| deadTime | The router's dead time (in seconds) |

TABLE 3

Neighbor Acquisition Response

| Field | Description |
|---|---|
| requestId | The corresponding request's requestId |
| isAccepted | Boolean value indicating if the relationship has been accepted (1 = accepted, 0 = not accepted) |
| senderId | The responding router's unique id |
| priority | The responding router's priority (1 through 4, where 1 is highest, 4 is lowest) |
| level | The tier level to which the responding router belongs |
| areaId | The unique id of the routing area to which the responding router belongs |
| deadTime | The responding router's dead time (in seconds) |

Each router initiates a single LSP that describes each link that the router has to each of its neighbors. For each link, the LSP describes attributes of the link, the primary one being the link cost. The cost associated with a link is typically an administratively provisioned value, where a lower link cost indicates a more preferred link, and a higher link cost represents a less preferred link. Alternatively, the link cost could be a calculated value representing an estimation of the communication delay between two nodes, calculated by measuring the communication delay and possibly factoring in bandwidth availability and the router's current load. For example, the cost can be computed based on the round-trip time of high priority echo packets initiating from one neighbor and returned by another. When an LSP is emitted by a node to each of its neighbors, it is flooded throughout the network (limited to the current network area to allow scalable networks). In this way, each node in the network (or the routing area) ends up with the same LSDB contents. In addition to the link cost, the LSP can contain other attributes about each link, such as a link color (used for segmenting links into groups for resource management) and available link bandwidth measures (used for traffic engineering).

The contents of the LSP message are shown in Table 4 below, and the LSPResp in Table 5 below. The requestId and the senderId are the same as described above. The sourceId is the unique identifier of the router that originated the LSP. When first originated, the senderId and the sourceId have the same value. Then, if the LSP is flooded onwards, the senderId contains the identifier of the router currently sending the LSP, while the sourceId still contains the id of the originator of the LSP. The sequenceNumber represents the instance number of the LSP, and is incremented by one each time a router originates a new instance of its LSP. The sequence number is not modified as the LSP is flooded throughout the network. This allows a receiving router to determine if an LSP from a source router (sourceId) is newer than the one that it currently has stored. Older LSPs are discarded if received. The linkCost contains information about each link to a neighbor that a router is reporting. At a minimum, the link cost contains the routerId for the router at the far-end of the link (i.e. the neighbor's routerId for the link), and the cost metric for the link. The link is a directed link from the sourceId router to the routerId router, with the specified link cost. There will be as many linkCost entries in the LSP as links that the sourceId router has to report. Note that an LSP contains the full set of links for a router. If a link goes down, a router reports this by originating a new LSP (with the sequence number incremented from the last LSP that it had originated), and the failed link is excluded from the list of links reported. A new link is reported by originating a new LSP, and including the new link along with the list of all other links that the router has to its neighbors.

TABLE 4

Link State Packet Request

| Field | Description |
|---|---|
| requestId | Sequential request identifier |
| senderId | The sending router's unique id |
| sourceId | The router's unique id for which the packet originated |
| sequenceNumber | The sequence number corresponding source's link state DB |
| linkCost | The neighbouring router's unique id along with the link's cost, i.e. a (routerId, cost) tuple. There is one such entry for each link being described. This tuple can be extended to carry other attributes for each link, examples of which were described above. |

TABLE 5

Link State Packet Response

| Field | Description |
|---|---|
| requestId | The corresponding request's requestId |
| senderId | The responding router's unique id |
| sourceId | The source router id as specified in the request |
| sequenceNumber | The corresponding request's sequence number |

The contents of the LSDD message are shown in Table 6 below, and the LSDDResp in Table 7 below. The requestId and the senderId are the same as described above. The LSDD carries the entire contents of the sending router's LSDB. The LSDB consists of all LSPs that the sending router knows of, including its own. The LSDB will consist of one or more LSPs, and each LSP consists of the sourceId of the router that originated the LSP into the network, the sequenceNumber for the LSP, and the list of linkCost entries that comprise the LSP.

TABLE 6

Link State Database Description Request

| Field | Description |
|---|---|
| requestId | Sequential request identifier |
| senderId | The sending router's unique id |
| Lsp | There is one Lsp entry for each Lsp being reported in the LSDD. The LSDD carries the entire LSDB contents of the sending router, i.e. the router's entire view of the routing area of which it is a member. Each Lsp entry contains a sourceId, sequenceNumber, and a list of linkCost entries, each with the same definition as in the LSP of Table 4 above. |

TABLE 7

Link State Database Description Response

| Field | Description |
|---|---|
| requestId | The corresponding request's requestId |
| senderId | The responding router's unique id |

The Hello message is used as a keep-alive message that is sent between XLSP neighbors on a timed-basis. If a router does not receive a Hello from a neighbor within the specified deadTime (taken from the NaReq received from the neighbor), then the neighbor is considered down. The contents of the Hello message are shown in Table 8 below, and the HelloResp in Table 9 below. The requestId and senderId fields have been described above. Note that the Hello Request could be extended to include deadTime (defined above) to allow the dead time to be changed dynamically without requiring a new XLSP handshake.

TABLE 8

Hello Request

| Field | Description |
|---|---|
| requestId | Sequential request identifier |
| senderId | The sending router's unique id |

TABLE 9

Hello Response

| Field | Description |
|---|---|
| requestId | The corresponding request's requestId |
| senderId | The responding router's unique id |

Each XLSP protocol instance maintains one finite state machine (FSM) for each of its current and prospective neighbors. The FSM is responsible for managing the XLSP handshake, sending Hello (keep-alive) messages, and processing received Link State Packets (LSPs). Neighbor relationships are provisioned on each router via a management interface. For example, in FIG. 2, content routers 7 and 8 are neighbors, and have link 43 between them (the link being a TCP connection in the preferred embodiment). Content router 7 is provisioned to have content router 8 as a neighbor, by specifying the IP address and TCP port of content router 8 that content router 7 should communicate with. Likewise, content router 8 is provisioned with the IP address and TCP port of content router 7 that content router 8 should communicate with. A content router can have many such neighbor relationships. For example, in FIG. 2, content router 7 has content routers 8 and 10 as neighbors. Note that full mesh connectivity is not required nor typically desired. The neighbor relations are planned taking into account the physical topology of the underlying network. Other techniques could be utilized in addition, such as utilizing routing information from the underlying network technology, such as IP, to determine the set of content routers and to automatically determine the required neighbor relationships among the content routers, for example, utilizing the cost metric information of the underlying network.

Figure 4:
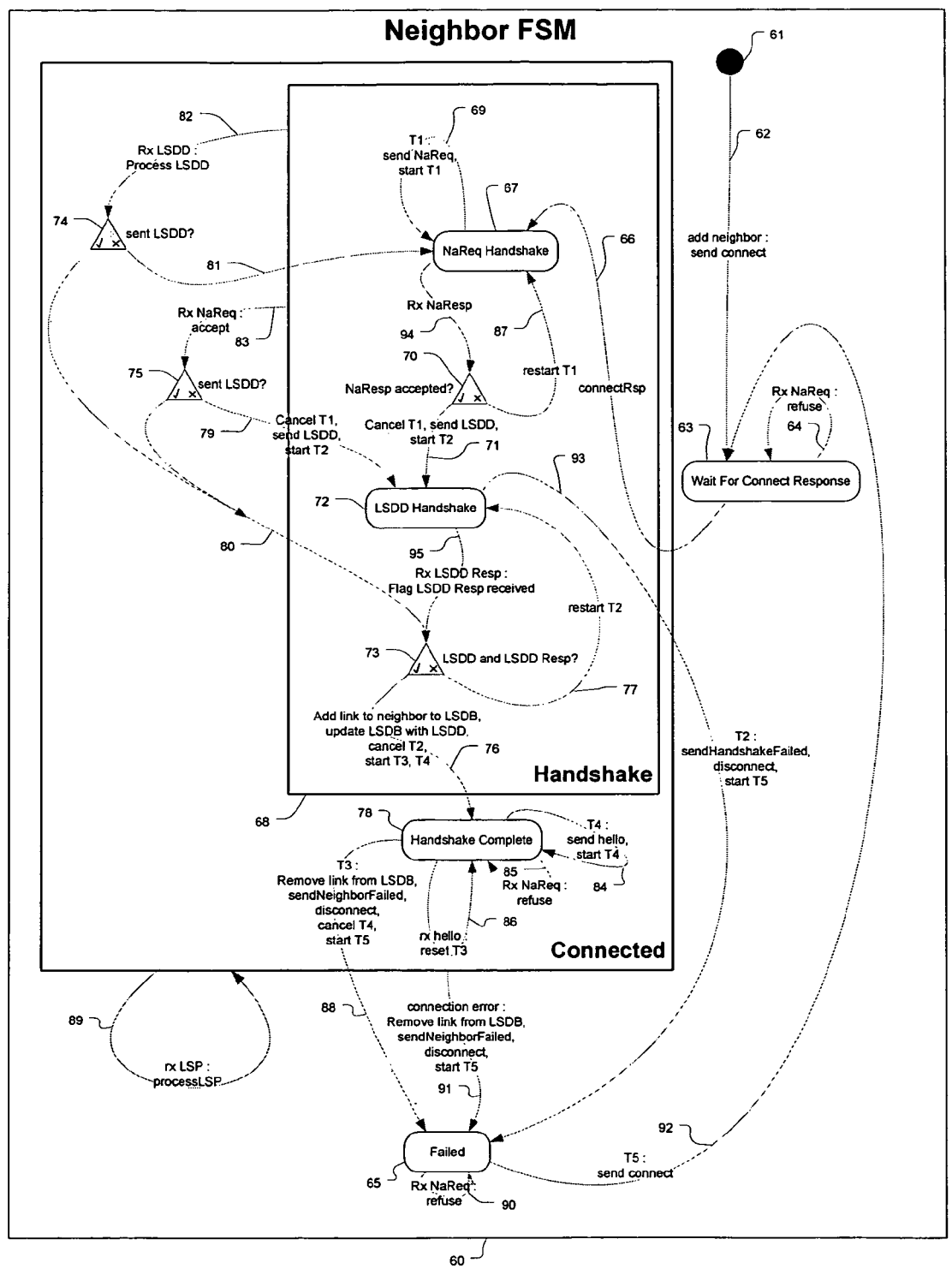
FIG. 4 shows the XLSP neighbor finite state machine.

FIG. 4 shows the XLSP Neighbor FSM 60. An instance of this FSM 60 is created for each new neighbor relationship configured. The FSM starts at point 61, and due to an add neighbor stimulus, sends a connect request (transition 62) to the dataplane, requesting a connection to the specified neighbor IP address and TCP port, and the state Wait for Connect Response 63 is entered. In state Wait for Connect Response 63, the FSM waits until a connection has been successfully established with the neighbor. Note that the dataplane continuously tries to establish the connection, while state 63 waits. Upon a successful connection indication, the FSM follows transition 66, sending a Neighbor Acquisition Request (NaReq), and starting timer T1, which has a default value of 60 seconds. Note that all protocol timers are configurable. Additionally, preferentially all XLSP timers are jittered (i.e. the duration is adjusted plus or minus a small random amount when the timer is started). State NaReq Handshake 67 is then entered. Note that the FSM is now in the Handshake phase 68.

The goal of the Handshake phase 68 is to send a Neighbor Acquisition Request (NaReq) to the neighbor and receive a Neighbor Acquisition Response (NaResp) indicating that it has been accepted, and then to send a Link State Database Description (LSDD) and get a response (LSDDResp) indicating that it has been accepted. In addition, a valid LSDD must be received from the neighbor, and an LSDD response is sent back; an NaResp is also sent back in response to a received NaReq from the neighbor.

State NaReq Handshake 67 waits for a NaResp that indicates that the NaReq sent has been accepted by the neighbor. While in state 67, if timer T1 expires, a new NaReq is sent and timer T1 is restarted (transition 69). When a NaResp is received, transition 94 is followed to decision point 70; decision point 70 checks to see if the NaReq had been accepted by the neighbor (field isAccepted within the NaResp). If not, transition 87 is followed, which restarts timer T1 so that a new NaReq will be sent upon the subsequent timer expiry as described previously. In this case, the FSM remains in state 67. If the NaResp indicates that the NaReq had been accepted, then transition 71 is followed, which stops timer T1, sends an LSDD message to the neighbor, and starts timer T2. Timer T2 has a default value of 30 seconds. State LSDD Handshake 72 is then entered. When an LSDD Response is received, decision point 73 is reached via transition 95. If an LSDD has been received from the neighbor and the response to the LSDD that this router sent has been received, then transition 76 is followed. This adds the link to the neighbor, which is now fully up, to the router's LSP in the LSDB, updates the LSDB with the LSDD received from the neighbor, sends an indication to the XLSP protocol subsystem that the LSDD exchange is compete, cancels timer T2, and starts timers T3 and T4. State HandShake Complete 78 is then entered. Timer T3 has a default value of 60 seconds, and Timer T4 has a default value of 20 seconds (one third of the deadTime that this router advertised to its neighbors). Note that timer T3 is the deadTime, and the value used by the FSM is the deadTime value taken from the NaReq received from the neighbor. At decision point 73, if the condition above has not been met (transition 77), timer T2 is restarted and state 72 remains active.

Note that a given pair of neighbors is each trying to establish a connection to each other, and each is running the FSM 60 for the neighbor relationship between them. As described in co-filed application 60/588,797, a pair of content routers with a neighbor relationship will each establish at least one TCP connection to each other. For example, in FIG. 2, content router 7 will establish a TCP connection to content router 8, and content router 8 will establish a TCP connection to content router 7. Thus, link 43 consists of a pair of TCP connections. This is due to the preferred use of HTTP over TCP, as explained in 60/588,797. In FIG. 4, while in state Wait For Connect Response 63, a NaReq can be received from the neighbor, as a result of it executing its own neighbor state machine, and its connection having been established first. If this occurs, transition 64 is followed, and the NaReq is refused by sending a Neighbor Acquisition Response (NaResp) indicating that the request has been refused (isAccepted field is set to 0). As described above, this will cause the neighbor router's FSM 60 to re-try again due to timer T1. Thus, both TCP connections must be established before either router will accept an NaReq from the neighbor.

While in the handshake phase 68, an LSDD can be received (transition 82) from the neighbor router, due to the neighbor routing running it's FSM 60. This causes decision point 74 to be reached, which checks if the local FSM has sent an LSDD. If not, state 67 remains active (via transition 81), otherwise transition 80 is taken to reach decision point 73, the operation of which has been described above.

While in the handshake phase 68, an NaReq can be received (transition 83) from the neighbor router, due to the neighbor router running its FSM 60. This results in sending an NaResp accepting the request (isAccepted is set to 1 in the response), and decision point 75 is reached. This decision point checks if this FSM has sent an LSDD. If not, transition 79 is followed, which cancels Timer T1, sends and LSDD, and starts Timer T2. Note that if the FSM had previously been in state 67, waiting for a NaResp indicating that the NaReq it previously sent has been accepted by the neighbor, a received NaReq from the neighbor is also treated as an NaResp indicating that the neighbor has accepted the request sent. The neighbor would not have sent a NaReq if it did not want to accept this router as its neighbor. Note however, that this behavior is optional; if information in the NaReq is used to determine if the neighbor should be accepted (such as protocol capabilities indicated in the NaReq), then an explicit NaResp should be waited for. At decision point 75, if an LSDD had been sent, then transition 80 is followed to reach decision point 73, the operation of which has been described above.

When state Handshake Complete 78 is active, the FSM 60 is in the connected phase. The goal of this phase of the FSM is to ensure that the neighbor is still reachable via the use of Hello messages and to reliably flood topology changes to neighbor nodes.

In state Handshake Complete 78, the expiry of Timer T4 (transition 84) indicates that it is time to send a Hello message to the neighbor. The Hello message is sent, Timer T4 is restarted, and state 78 remains active. Note that a Hello response will be received for each Hello sent, but the state machine does not track this. Whenever a Hello message is received from the neighbor, transition 86 is followed, and Timer T3 is reset, since the FSM knows that the neighbor is still present, and state 78 remains active. If a NaReq message is received, transition 85 is followed, and the request is rejected (isAccepted set to 0), since we already have a neighbor relationship with the neighbor, and state 78 remains active. Note that an alternative is to send an NaResp (with isAccepted set to 1), and then proceeding to state LSDD Handshake 72 in a manner similar to transition 71 described above, but timers T3 and T4 are stopped instead of timer T1. If Timer T3 expires, indicating that the router has not received a Hello from the neighbor within the deadTime interval, then transition 88 is followed to state Failed 65. This transition removes the link to the neighbor from the router's LSP in the database (since the link is no longer up), tells the XLSP subsystems that the neighbor has failed, asks the dataplane to disconnect the TCP connection, cancels timer T4, and starts timer T5, which has a default time of 60 seconds.

While in the Handshake or Connected phase, when an LSP is received, transition 89 is followed. This transition processes the received LSP, sends an LSPResp back, and stays in the same state. The processing of an LSP is as follows. When in the state Handshake Complete 78, the sequence number of the LSP is examined, and if it is newer than what is stored in the LSDB, or if the LSP was not present in the LSDB at all, the LSDB is updated with the LSP, and the LSP is flooded out to all neighbor links except for the one that the LSP arrived on. If the sequence number of the received LSP is older than what is in the LSDB, then the LSDB is not affected, and the newer LSP stored in the LSDB is sent back to just the neighbor that sent this router the out-of-date LSP, in order to update that neighbor router with the new information. If the active state is not 78, then if a LSDD has not yet been received, the LSP is not used. If an LSDD has been received, the LSP is compared against the LSP in the received LSDD, and if it is newer, the LSP in the LSDD is replaced with the newer instance. In this way, when the LSDD is later committed to the LSDB (transition 76), the newest received information is used.

In the state Failed 65, a received NaReq is responded to with a NaResp indicating that the NaReq was not accepted (transition 90), and state 65 remains active. An alternative optional action for a received NaReq is to queue the message, stop timer T5, and follow transition 92. Transition 92 sends a connect request to the Dataplane to re-establish the TCP connection, and enters state 63. When timer T5 expires, transition 92 is followed.

The state Failed 65 can also be reached from states 67, 72 or 78 due to an indication from the dataplane that the connection has failed (e.g. the TCP connection has gone down). This will result in transition 91 being followed, which removes the neighbor from the router's LSP (if it was present, i.e. the handshake was complete) in the LSDB and floods the LSP (only if changed) to all neighbors, indicates to the XLSP subsystem that the neighbor has failed, disconnects the TCP connection, cancels any timers running, and starts Timer T5.

The state Failed 65 can also be reached from state LSDD Handshake 72 when Timer T2 expires (transition 93). This occurs when the LSDD handshake did not complete in the required amount of time. When this transition is taken, the XLSP subsystem is informed that the handshake failed, a request is sent to the dataplane to disconnect the TCP connection, Timer T5 is started, and state Failed 65 becomes active.

In the FSM 60, in a given state (or group of states), if a message is not indicated, then the default behavior is to log the message, send a response and ignore the received message. For example, in the Handshake Complete state 78, a received LSDD is handled by sending an LSDDResp and then ignoring the contents of the LSDD. Alternatively, unexpected messages can optionally result in tearing down the peering session with the node which sent the message.

Link state routing protocols require all nodes to have the same representation of the network's topology. In order to have a shared view of the network, nodes must ensure that their local link state packet (LSP) is distributed amongst all nodes, as well as maintain the most recent instance of every other node's link state packet. The link state packets are all stored in the router's link state database (LSDB). In the exemplary network depicted in FIG. 5, there are four content routers 100, 101, 102 and 103 with respective router unique IDs A, B, C, and D. Link 104 connects routers 100 and 101, and has a link cost of 1. Note that in this example, the link cost in both directions is 1. However, the link cost from 100 to 101 can be assigned a different value from the link cost from 101 to 100, and the XLSP protocol supports this. Similarly, link 105 has a cost of 2, link 106 has a cost of 5, link 107 has a cost of 4, and link 108 has a cost of 3.

Figure 5:
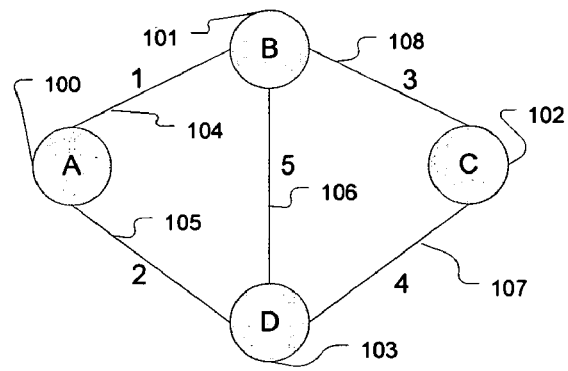
FIG. 5 shows a sample network topology.

Table 10 below illustrates what every node's link state database should contain for the network depicted in FIG. 5. A link state packet's instance is identified by its sequence number. In the LSDB, the LSP for source router ID A (the first table entry) indicates that the sequence number of the LSP is 1, and that source Router ID A is advertising two links: a links to router ID B with a cost of 1 (corresponding to link 104 in FIG. 5), and a link to Router ID D with a cost of 2 (corresponding to link 105). The LSP for source router ID B (the second table entry) indicates that the sequence number of the LSP is 3, and that source router ID B is advertising three links: a link to router ID A with a cost of 1 (link 104), a link to router ID D with a cost of 5 (link 106), and a link to router ID C with a cost of 3 (link 108). The LSP for source router ID C (the third table entry) indicates that the sequence number of the LSP is 2, and that source router ID C is advertising two links: a link to router ID B with a cost of 3 (link 108), and a link to router ID D with a cost of 4 (link 107). The LSP for source router ID D (the fourth table entry) indicates that the sequence number of the LSP is 5, and that source router ID D is advertising three links: a link to router ID A with a cost of 2 (link 105), a link to router ID B with a cost of 5 (link 106), and a link to router ID C with a cost of 4 (link 107). Note that if the LSP contains other link attributes or metrics such as link colors or available bandwidth, then this additional information would appear in the LSDB stored against each link entry along with the cost information.

TABLE 10

Link State DatabaseExample

Link State Database

| Source Router ID | Seq. Number, {(Neighbor 1 ID:Cost), ..., (Neighbor N ID:Cost)} |
|---|---|
| A | 1, {(B:1), (D:2)} |
| B | 3, {(A:1), (D:5), (C:3)} |

TABLE 10-continued

Link State DatabaseExample

| Source Router ID | Link State Database Seq. Number, {(Neighbor 1 ID:Cost), ..., (Neighbor N ID:Cost)} |
|---|---|
| C | 2, {(B:3), (D:4)} |
| D | 5, {(A:2), (B:5), (C:4)} |

Figure 6:
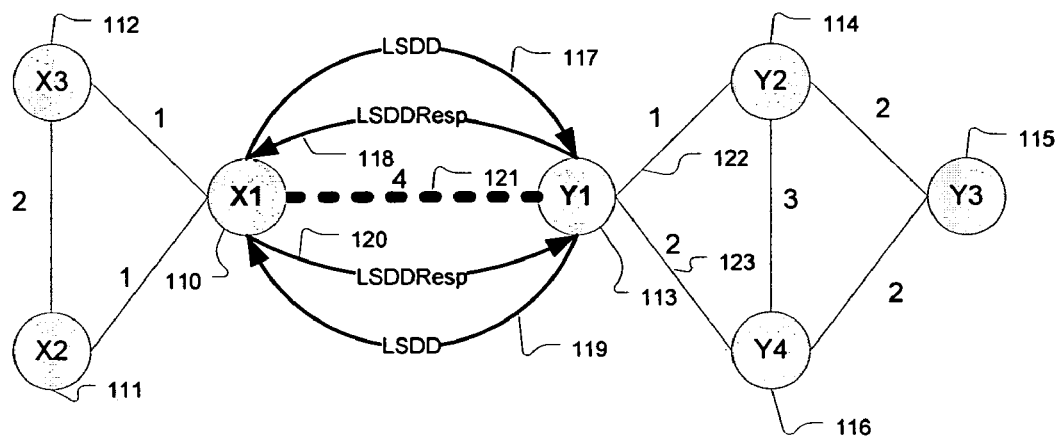
FIG. 6 shows an LSDD messaging example.

FIG. 6 provides another sample network topology, and illustrates the effect of adding a new link between two previously unconnected sub-networks. Before the addition of link 121, routers 110, 111, and 112, which have the unique router IDs X1, X2 and X3 respectively, were connected. The LSDB of routers 110, 111 and 112 is shown in Table 11 below. In addition, routers 113, 114, 115 and 116 have the unique router IDs Y1, Y2, Y3 and Y4 respectively, and were connected. The LSDB of routers 113 through 116 is shown in Table 12 below.

TABLE 11

LSDB of X1, X2 and X3 before addition of link 121

| Source Router ID | Link State Database Seq. Number, {(Neighbor 1 ID:Cost), ..., (Neighbor N ID:Cost)} |
|---|---|
| X1 | 2, {(X2:1), (X3:1)} |
| X2 | 4, {(X3:2), (X1:1)} |
| X3 | 6, {(X1:1), (X2:2)} |

TABLE 12

LSDB of Y1, Y2, Y3 and Y4 before addition of link 121

| Source Router ID | Link State Database Seq. Number, {(Neighbor 1 ID:Cost), ..., (Neighbor N ID:Cost)} |
|---|---|
| Y1 | 1, {(Y2:1), (Y4:2)} |
| Y2 | 1, {(Y1:1), (Y3:2), (Y4:3)} |
| Y3 | 2, {(Y2:2), (Y4:2)} |
| Y4 | 2, {(Y1:2), (Y2:3), (Y3:2)} |

In FIG. 6, when routers 110 and 113 are configured to have each other as neighbor's, forming link 121 (shown with a cost of 4 in each direction), router 110 and router 113 will run the XLSP neighbor finite state machine for this new neighbor relationship as previously described. As part of this, router 110 will send LSDD 117 to router 113, providing the LSDB contents as per Table 11 above, and router 113 will respond with LSDDResp 118. Router 113 will send LSDD 119 to router 110, providing the LSDB contents as per Table 12 above, and router 110 will respond with LSDBResp 120. Once router 110 has completed the handshake, it will first update its LSP (router ID X1) in its LSDB to include the neighbor Y1 with a cost of 4, and the sequence number of the LSP will increase by one. This will cause router 110 to flood its LSP to its neighbors, which is routers 111, 112 and 113. Each receiving router will compare the LSP to the instance in its LSDB, see that the received instance is newer (by examining the sequence number), and the LSP will be in turn flooded to all its neighbors (but not to the neighbor from which it received the LSP). Router 113 will similarly update and flood it's LSP due to the addition of router 110 as a neighbor (link 121). In addition, router 100 will update its LSDB with the information received in the LSDD from router 113. Each LSP in the LSDD will be examined compared to what is currently stored in the LSDB. Any new or updated LSPs will cause them to be flooded to all neighbors (except the one that sent the LSDD). Note that the individual new LSPs are sent, and not the LSDD. Similarly, router 113 will update its LSDB with the information received in the LSDD from router 110, and flood any new LSPs. When flooding is complete (XLSP has converged), each router 110 through 116 will contain the same LSDB contents as per Table 13 below. Notice that the entry for the source router ID X1 now has Y1 as a neighbor, and the sequence number has increased. Similarly, the entry for the source router ID Y1 now has X1 as a neighbor, and the sequence number has increased.

TABLE 13

LSDB of X1, X2, X3, Y1, Y2, Y3 and Y4 after addition of link 12

| Source Router ID | Link State Database Seq. Number, {(Neighbor 1 ID:Cost), ..., (Neighbor N ID:Cost)} |
|---|---|
| X1 | 3, {(X2:1), (X3:1), (Y1:4)} |
| X2 | 4, {(X3:2), (X1:1)} |
| X3 | 6, {(X1:1), (X2:2)} |
| Y1 | 2, {(Y2:1), (Y4:2), (X1:4)} |
| Y2 | 1, {(Y1:1), (Y3:2), (Y4:3)} |
| Y3 | 2, {(Y2:2), (Y4:2)} |
| Y4 | 2, {(Y1:2), (Y2:3), (Y3:2)} |

In a similar manner, when a router detects that a link to a neighbor has gone down (for example, by detecting that the TCP connection has gone down, or by detecting absence of received Hello messages from the neighbor as per the neighbor FSM described above), it removes the neighbor (called $N_F$ below) from its LSP in its LSDB, increases the sequence number of its LSP, and then floods it to all neighbors which are still considered up (i.e. not to the neighbor that was just determined to be down). This LSP will propagate through the network as described above. Note that the LSP for the neighbor $N_F$ is not removed from the LSDB—the neighbor $N_F$ may not have failed, and just the link to $N_F$ may have failed. If the neighbor $N_F$ has in fact failed, then every other neighbor to this failed router will also detect that their links to the failed router $N_F$ have gone down, and will update and flood their LSP to indicate this. In this case, all links to the failed router will be removed from all LSDBs. The LSDB should be consulted to identify all $N_F$'s neighbor's and allow time for each of their new LSPs to arrive before re-computing the topology trees.

When an LSP is received, its sequence number is compared to the sequence number of the LSP stored in the LSDB for the same source router ID (sourceId). The LSP is considered to be new information if the received sequence number is newer (higher) than that of the LSP in the LSDB, or if the LSP was not present in the LSDB. If the received sequence number is the same as in the LSDB, then the LSP not used, since there is no new information. Note that as an option, each LSP could be extended to carry a checksum, and when a received LSP has the same sequence number as the LSP instance in the LSDB, the checksum could be compared to verify that the contents are indeed the same (and to help detect data corruption in the received LSP or in the LSDB). If the received sequence number is older (lower) than what is present in the LSDB, then the LSP from the LSDB is sent back to the sender of the LSP (determined by the senderId field of the message) in order to provide it with the more recent LSP. The LSDB is updated with any new LSPs received, and the new LSP is flooded to all neighbors, other than the neighbor from which it was received. Note that a numerically larger sequence numbers is considered newer. Sequence numbers use a very large number space, such as a 64-bit quantity, and thus will never roll over within any reasonable time horizon of operation. For example, with a 64-bit sequence number, the sequence number can change once a microsecond (much faster than would ever occur) for over 580,000 years before roll-over. This avoids the added complexity of sequence number roll-over handling required in link state protocols such as OSPF due to the much smaller sequence number space. Note that when a router processes the contents of a received LSDD, each LSP in the LSDD is treated as per how individually received LSPs are treated as described above.

Another sequence number scenario that must be handled is the case of a router restart (due for example to a restart of the routing software, or replacement of the entire router, etc.). The restarting routing software will typically not remember the sequence number that it had last emitted for its LSP, and will restart at 1. However, other routers in the network may still have the restarting router's old LSP with a higher sequence number (which would appear to be newer when in fact it is older), or an old LSP with a sequence number of 1. This situation is resolved as follows. When the restarting router emits its LSP with a sequence number of 1, if the LSP for the router already exists with a higher sequence number, the seemingly newer LSP (higher sequence number) will be sent back as described above. If a router sees its own LSP come back to it with a sequence number higher than its own LSDB copy, then it takes the sequence number for its LSP that was sent by another router, uses a higher sequence than that for its own LSP (updating its LSDB), and re-floods its LSP. Now, this newly-flooded LSP will be taken by all routers in the network to be the newest LSP. The other scenario that must be handled is if a restarting router issues its LSP with a sequence number of 1, and other routers in already have an older instance of the LSP also with a sequence number of 1. This case is detected as follows. When a router receives its own LSP from a neighbor router (as part of the XLSP handshake), if the sequence numbers are equal, the receiving router verifies the contents of the LSP to make sure that it indeed matches the contents of its own LSP in its LSDB. If a mismatch is detected, the router re-issues its own LSP with the next higher sequence number, which causes the other routers to accept this new LSP as the latest instance.

For increased robustness, LSPs can be re-issued on a timed basis with a new sequence number each time, and routers can age out LSPs from their LSDB if they are not refreshed. This is similar to the mechanism used by OSPF to age out stale Link State Advertisements (LSA) from the OSPF database. For example, each router can re-issue its LSP every 30 minutes, with the timer jittered randomly plus or minus 3 minutes to avoid all routers re-issuing their LSPs at the same time. Each time a router re-issues its LSP on a timed basis, the sequence number is incremented, even though the contents have not changed. Each router runs an aging timer for each LSP stored in its LSDB (except its own), with an example duration of 70 minutes. Whenever an LSP is received which is newer, the aging timer is restarted. The aging timer for an LSP will only expire if an LSP has not been refreshed with a new sequence number for 70 minutes, and at that point, the LSP is declared stale and is removed from the LSDB, resulting in the topology to be recomputed.

When sending an XLSP messages from one router to another, the response message does not always have to be checked by the sending router—this is an implementation option. When TCP is used as the communications method between two routers, TCP provides the delivery guarantee between routers. If a message cannot be delivered over the TCP link, the TCP link will go down, and the neighbor FSM described above will react. Moreover, if the Hello messages are not getting through from one router to the neighbor, the neighbor router's neighbor FSM will react. However, tracking outstanding response messages, such as when an LSP is sent, can provide an optional extra level of robustness, for example, to help protect against software logic faults, or internal communication buffer overflows within the software of the router. Note that the neighbor FSM described above does check for some responses, such as for an NaReq and an LSDD, but not for Hello and LSP messages.

XML Subscription Management Protocol (XSMP) is a content routing protocol. With content routing, subscribers express the type of content they wish to receive, using a subscription language. Publishers push documents into the network, without needing to know what subscribers, if any, are interested in the content at any given time. Content routers route published documents to each subscriber who has issued a subscription which matches the content of the published document. The routing is done in an efficient manner such that a single copy of a document is sent over a given TCP link between routers, regardless of how many subscribers downstream from that link will be receiving the document. This provides efficient use of bandwidth in the network. In addition, only one copy of a document is delivered to a given subscriber, even if the subscriber has issued multiple subscriptions and more than one subscription matches a given document.

In the preferred embodiment, the format used for published documents is XML, and the subscription syntax is XML Path Language (XPath) (refer to reference "XML Path Language (XPath) Version 1.0", W3C Recommendation 16 Nov. 1999, W3C (Word Wide Web Consortium)). Note that the techniques described are suitable for other documents formats, and subscription syntax other than XPath can be utilized.

XML Subscription Management Protocol (XSMP) is a per-source content routing protocol, which means, within a given routing area, only the source router (the router receiving a document from a publisher) parses and matches the document against the subscriptions from all other routers in the routing area. The document is then explicitly addressed to all interested routers and delivered to them using the shortest available path. Note that on a given link only one copy of a document is ever delivered, since the document can be addressed to multiple routers. Each addressed router then parses and matches the document one final time to determine the set of locally-attached subscribers that the document needs to be delivered to. Additionally, when a document enters a new routing area over an inter-area link, as described further below, the document is re-parsed and matched to determine how to route the document onwards.

The XSMP requires the presence of a link state routing protocol which can provide details of the topology of the network. This information is required for a router to determine the route to other routers in the network. In addition, the XSMP must be notified immediately upon any change in the topology that impacts routes to be taken. Note that XLSP is used to provide this information.

With reference to FIG. 2, a content router, such as 7, needs to be able to authenticate and accept documents from a locally-attached publisher, such as 11 and 12, and route published documents into the network where needed. In addition, the content router 7 must be able to authenticate locally-attached subscribers, such as 14 and 15, and accept and manage subscriptions from locally attached subscribers. A subscriber may directly communicate the subscriptions it wants to a content router, as described below. In addition, a management system, such as a subscriber management system, an element management system, a network management system, or an operational support system (OSS), as known in the art, can configure subscription information on behalf of an attached subscriber. For example, subscriber 14 may send protocol messages over link 42 to content router 7 to add and remove subscriptions. Or, an OSS may configure subscriptions for subscriber 14 over a management protocol, such as Simple Network Management Protocol (SNMP), a command-line interface, or the like. In addition, a network operator could directly configure subscriptions for the content router, using a command line interface or a web browser interface to the content router 7.

As described above, each content router, such as 7, will learn the set of local subscriptions for its attached subscribers. This set of subscriptions is used to determine which local subscribers a document needs to be routed to. In addition, the content router must inform all other content routers of documents which it needs to receive to satisfy its local subscribers. Note that if an application is running on the content router itself which requires documents, that application appears logically as another local subscriber. In XSMP, each content router, such as content router 7, amalgamates all of its local subscriptions into one set of subscriptions. This set of subscriptions is known as a "covering set". In the simplest case, the set of subscriptions can simply have duplicates filtered out. For example, if subscriber 14 and subscriber 15 both request a subscription of "/newsm1", then only one such subscription need be reported to other content routers. Only content router 7 need be aware that there is more than one local subscriber that wants documents matching the subscription "/newsm1". In addition, a subscription may "cover" another subscription. For example, the subscription "/a" covers the subscription "/a/b", since all documents matching the latter subscription will also be matched by the former subscription. Thus, only the "/a" subscription need be reported by content router 7 to other content routers. More complex examples of covering subscriptions exist, as is known in the art. The method of computing the covering relations among a set of subscriptions is independent of the operation of the XSMP protocol. An example of a covering set is shown further below.

In XSMP, each content router computes a set of subscriptions to be reported to other content routers, eliminating duplicates and optionally possibly reducing the set of subscriptions to be reported by utilizing a covering set algorithm. This set of subscriptions is then reliably distributed to every other content router in the routing area. This allows each router to build up the content of the XML Subscription Database (XSDB) 54 of FIG. 3. The XSDB contains the subscriptions for the local subscribers, and the subscriptions for the remote content routers. Once the XSDB has been formed, content routing can be carried out. The contents of the XSDB 54 are placed in a Content Routing Information Base (CRIB) 55 for use by the matching algorithm.

Referring to FIG. 2, when a document is published by publisher 11 over link 41 to content router 7, content router 7 will parse the received XML document and match it against the set of subscriptions. This matching operation will result in a set of zero or more local subscribers who wish to receive the document, and a set of zero or more remote content routers who wish to receive the document. Note that content router 7 is not aware of which subscribers on a remote content router wish to receive the document. For example, the received document may match one or more subscriptions for local subscriber 14, and so a single copy of the document is sent over link 42 to subscriber 14. However, the document may not match any subscriptions for local subscriber 15, so that document is not sent to that subscriber. Similarly, a document is needed at most once by a given remote content router even if it matches multiple subscriptions from that content router (and not needed at all if no subscriptions are matched for that content router). The forwarding table, produced by the Topology Information Base (TIB), allows the dataplane to determine the next hop (or hops) to take for a document to reach all required destination content routers. For example, suppose the received document from a publisher at content router 7 matches the subscriptions of content routers 8 and 9. The network topology and link costs may have determined that the route to content router 8 is over link 43, and the route to content router 9 is also over link 43 (via content router 8). Thus, a single copy of the document needs to be sent by content router 7 over link 43. This document is addressed to both content router 8 and content router 9, i.e. the document can carry a set of destination addresses. The manner in which this is done is described in co-filed application Ser. No. 60/530,677, the contents of which are herein incorporated by reference. This is different than the prior art. For example, in IP unicast, a packet can have exactly one destination IP address, and in IP multicast, a packet can have exactly one destination IP multicast address, and that address represents a pre-defined multicast group. Note that with IP multicast, the members of the multicast group can be dynamic, with members joining and leaving the group, but each member of the group receives the same content stream. With the scheme of XLSP and XSMP, a document can have a list of one or more destination addresses, and the destination address is set on a document by document basis based upon the content of the document and the set of subscriptions in the network. Thus each subscriber receives a stream of documents that match the subscriptions of the subscriber, as opposed to a pre-determined content stream of an IP multicast group. The method of encoding a list of one or more destination addresses for a document (as well as for a protocol message such as an XLSP or an XSMP protocol message) is described in application 60/530,677. Note that in the prior art for content routing, the document does not have a destination address at all, and each router along the path of document transmission must match the document against its view of the subscriptions in the network. This can lead to routing loops unless other restrictions are put into place, such as a strict tree distribution hierarchy, or the use of a global spanning tree or a technique such as all-pairs path symmetry as reference above. Continuing the above example, the document will be received by content router 8. Content router 8 can now do the following parallel processing. If content router 8 appears in the destination list, it removes itself from the list and passes the document to its local matching algorithm for delivery to local subscribers. Note that when this matching algorithm is performed, it need only be performed against the local subscriptions for content router 8, and not for the network-wide set of subscriptions. This will result in a faster matching time as the document need only be processed against a smaller set of subscriptions. The result of this processing will result in a set of zero or more local subscribers that need received a copy of the document. Note that the matching may yield zero subscribers since removal of a local subscription may not yet have propagated through the network as documents are still being routed that match that subscription. In addition, in order to keep network routing tables small, a router can optionally advertise a smaller set of subscriptions that provides a wider range of interest than the local subscriptions reflect. For example, if there were a million local subscriptions looking for a large set of divergent keywords or phrases for a field of a document, a router could reduce this to simply a single subscription that looks for documents with this field, without concern for the actual contents. This can result in more documents than necessary reaching this content router, but with the advantage of the network content routing tables being much smaller. Thus, a tradeoff can be made between the bandwidth consumed in the network and the size of the content routing tables.

Continuing the above example, in parallel with any local matching operation that is being performed at content router 8, content router 8 also forwards the document to each router in the remaining destination list. In this case, there is only one such router, and so the document is forwarded on to content router 9 over link 44. Note that the. document can be routed onwards independently of the local matching operation at content router 8. This allows the documents to rapidly propagate to each content router that requires the document for delivery to local subscribers. This provides fairer service to subscribers, which can be important for time-sensitive information such as stock quotes where each subscriber in the network should receive the information as close in time as possible. In routing techniques of the prior art, the document has to be matched at each hop of the propagation path before the document can be routed onwards, greatly slowing the propagation time. When the document reaches content router 9, only content router 9 is in the destination list, and so the document is processed for local subscription matches, and no further forwarding is needed.

Note that a document can reach a content router where the content router is not part of the destination address list. If content router 7 receives a document that is just required by content router 9, it would send a copy of the document over link 43 with only content router 9 in the destination address list. When content router 8 receives this document, it would forward it onwards to content router 9, and would do no matching operation against local subscribers since content router 8 is not in the destination address list. Thus, a content router only has to parse the document and perform content matching if it appears in the destination address list.

Note that a document can be sent over more than one link at the same time. For example, if content router 7 determined that content router 10 also needed the document, it could have sent one copy of the document over link 46 with content router 10 in the destination list, and a copy of the document over link 43 with content router 8 and 9 in the destination list. Moreover, when a content router receives a document with more than one other remote router in the destination list, it can split the destination list, sending a copy over one link to reach one set of routers, and sending a copy over different links to reach other routers. For example, in reference to FIG. 6, if content router 113 receives a document over link 121 from content router 110 addressed to content routers 114, 115 and 116, a copy of the document can be sent over link 122 addressed to content routers 114 and 115, and a copy over link 123 addressed to content router 116.

To protect against errors causing a document to loop through the network forever, e.g. due to inconsistent link state databases, the document can also be given a "hops left" counter. The hops left counter is encoded with the document as described in application 60/530,677, and operates in a similar manner to the IP "time to live" packet field. This provides an additional level of robustness.

Note that the description above relating to the addressing and routing (including endless loop prevention) of a document to a plurality of content routers also applies to any other message. For example, an XSMP protocol message (described below) can be routed to multiple destinations in the same manner.

Figure 7:
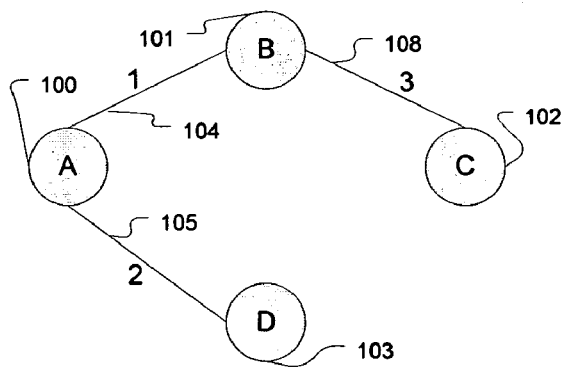
FIG. 7 shows an example prior art broadcast tree.
Figure 8:
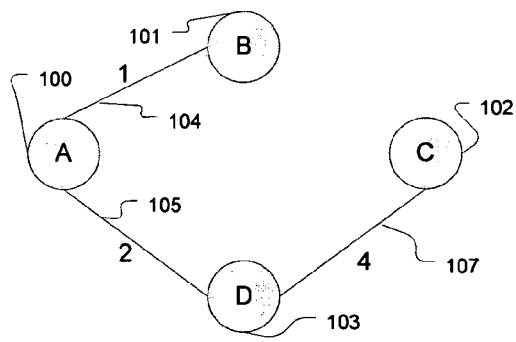
FIG. 8 shows an example prior art broadcast tree after link failure.

Another advantage of the technique used in the current invention is its ability to react quickly to a change in network topology with a minimum of routing traffic, as opposed to the prior art. In the prior art, a broadcast tree would be determined, and subscriptions would be propagated along the broadcast tree. At each point, subscriptions would be amalgamated before being propagated onwards. For example, for the sample network topology of FIG. 5, the broadcast tree for content router 100 as the root could be that shown in FIG. 7, with the labels matching FIG. 5. In FIG. 7, content router 102 would send its subscriptions, reduced through the covering set technique described above, to content router 101. Content router 101 would form a new covering set, using all of its local subscriptions, plus the subscriptions received from content router 102, and send this new covering set to content router 100. Similarly, content router 103 would send its covering set to content router 100. When a document arrived at content router 100, it may match one or more subscriptions in the covering set from content router 101, and so a copy of the document is sent to content router 101. Note that content router 100 does not know if the document is needed by content router 101, content router 102, or both, and only that it is needed by content router 101 or a downstream router. Content router 101 then matches the document against its subscription database, possibly sending the document to local subscribers as well as to content router 102. Note that content router 101 cannot propagate the document to content router 102 until the matching operation at content router 101 is performed, delaying the document propagation. Note also that in this scheme, the contents of the subscription database depend on the topology being used, which is a major flaw. For example, suppose link 108 fails. The broadcast tree for root router 100 must now be reconfigured to that of FIG. 8, with the labels again matching those of FIG. 5. From the perspective of content router 100, content router 102 is now reachable via content router 103 instead of content router 101. This means that content router 101 must remove all the subscriptions it had received from content router 102, re-compute its covering set, and re-send its new covering set (or changes from its old covering set) to content router 100. Similarly, content router 103 must receive a covering set from content router 102, compute a new covering set taking into account its local subscriptions, and send this new covering set (or the updates from the old covering set) to content router 100. This results in massive churn in the content routing tables in the network and massive delay in converging the network, and interrupting dataflow during the convergence process. The number of subscriptions in the network can run into the millions, and this can lead to a large amount of routing traffic and large amounts of computation time and resources, leading to long convergence times. Moreover, even without topology changes, as subscriptions come and go from the network, this can result in covering set computations occurring on multiple nodes in parallel. For example, if just subscribers on content router 102 are adding and removing subscriptions in FIG. 8, this also leads to content router 103 having to perform covering set calculations so that its new covering set can be sent to content router 100.

With the current invention, the propagation of subscriptions does not depend upon the current network topology. A link failure as described above would result in no changes to any of the subscription databases in the network. Only the XLSP must react to report the link failure, and each router can re-compute its forwarding tables. Since the forwarding table is independent of the very large subscription database, this solution converges rapidly after a topology changes with a minimum of routing traffic and dataplane disruption. Moreover, as subscriptions come and go on a given content router, only that router must compute its new covering set, and then propagate any changes to the other content routers. In addition, the technique utilized in this invention allows for support of equal cost multipath forwarding, as is known in the art, whereas the previous art, by virtue of the scheme used for subscription distribution, does not. For example, in reference to FIG. 5, suppose that links 104, 105, 107 and 108 all had a link cost metric of 1 (as opposed to those shown in FIG. 5). Then, content router 100 would have two equal cost paths to content router 102: the path over links 104 and then 108, and the other path over links 105 and then 107. Content router 100 could send traffic to content router 102 over both these paths, and the contents of the subscription databases in the network are not affected. This is not possible in the prior art. Note that if the document order must be preserved from a given publisher, then a simple technique is to only use one path for a given publisher, but another path can be used for documents from a different publisher, and thus bandwidth can still be used more effectively throughout the network.

The XSMP has the following responsibilities: subscriber management, synchronization of all XSMP nodes in a routing area, support for inter-area links, subscription propagation, and content routing information base updates.

The XSMP routing protocol is request/response based. The complete list of XSMP messages is provided in Table 14 below.

TABLE 14

List of XSMP Messages

XSMP Messages

| Request | Response |
| --- | --- |
| Register XSMP Node Request (RegNode) | Register XSMP Node Response (RegNodeResp) |
| XML Subscription Database Description Request (XSDD) | XML Subscription Database Description Response (XSDDResp) |
| XML Subscription Request (XSR) | XML Subscription Request Response (XSRResp) |
| Subscription Update Request (SU) | Subscription Update Response (SUResp) |

The RegNode message allows an XSMP node to inform all other XSMP nodes of their current configuration, as well as a list of other well-known XSMP nodes as described below. The contents of the RegNode message are shown in Table 15 below, and the contents of the RegNodeResp message are shown in Table 16 below. Note that the RegNode message could be extended to include other information related to the XSMP protocol for each XSMP node being described, such as the maximum transfer unit for XSMP messages supported, protocol version number, limits such as the number of subscriptions and prefixes supported the node, etc. This would be done by extending the nodeId entry to be a tuple of information. The RegNodeResp indicates whether the RegNode message was accepted or rejected via the "isOk" field. This allows a node receiving a RegNode to accept or reject the RegNode message. For example, a regNode could be rejected if the receiving node does not wish to perform an XSMP handshake with the sending node.

TABLE 15

Register XSMP Node Request

| Field | Description |
| --- | --- |
| senderId | The sending endpoint's unique id |
| nodeId | There is one nodeId entry for each well-known XSMP node being listed, containing the unique ID of the XSMP node. Note that this also includes the senderId node itself. |

TABLE 16

Register XSMP Node Response

| Field | Description |
| --- | --- |
| senderId | The responding router's id |
| isOk | Boolean value indicating whether the registration was successful or not |

The XSDD message summarizes the contents of the sending node's XML subscription database (XSDB). The XSDB of a node contains one row for every known XSMP node in the network, including itself. The rows are summarized by their unique router ID and the range of XSMP update packet sequence numbers contained within it. The contents of the XSDD message are shown in Table 17 below, and the contents of the XSDDResp message are shown in Table 18 below.

TABLE 17

XML Subscription Database Description Request

| Field | Description |
| --- | --- |
| senderId | The sending router's id |
| XsdbRowDescription | There is one XsdbRowDescription entry for each XSDB row being described. Each XsdbRowDescription consists of the tuple (nodeId, firstSeqNum, lastSeqNum). nodeId is the router id whose XSDB row is being described. firstSeqNum is the sequence number of the first packet in the XSDB row for the nodeId. lastSeqNum is the sequence number of the last packet in the XSDB row for the nodeId. |

TABLE 18

XML Subscription Database Description Response

| Field | Description |
| --- | --- |
| senderId | The responding router's id |
| isOk | Boolean value indicating whether the database description was processed successfully or not |

The XSR message is used to request a set of XSMP update packets for one or more XSMP nodes. The recipient of this message will respond with an XSRResp, and will deliver zero or more SU messages containing the requested information based on the contents of its XSDB. The XSR message can also be used to request a node's RegNode message, causing the responding node to send a RegNode message. The XSR message can also be used to request a node's XSDD message, causing the responding node to send an XSDD message. The contents of the XSR message are shown in Table 19 below, and the contents of the XSRResp are shown in Table 20 below.

TABLE 19

XML Subscription Request

| Field | Description |
|---|---|
| senderId | The sending router's id |
| reqNodeInfo | Boolean flag indicating interest in node information (i.e. true to request the recipient to send RegNode) |
| reqXsdd | Boolean flag indicating interest in a node's XSDD (i.e. true to request the recipient to send XSDD) |
| XsmpUpdateRequest | There is one XsmpUpdateRequest entry for each update range being requested. Each XsmpUpdateRequest entry is a tuple of (nodeId, firstSeqNum, lastSeqNum). nodeId is the router id whose XSDB row is being requested. firstSeqNum is the sequence number of the first packet being requested. lastSeqNum is the sequence number of the last packet being requested. |

TABLE 20

XML Subscription Request Response

| Field | Description |
|---|---|
| senderId | The responding router's id |
| isOk | Boolean value indicating whether the request was fulfilled successfully or not |

The SU message contains a list of sequence-numbered XSMP update packets as well as a summary of the node's XSDB row contents (first and last sequence number). There are two types of XSMP update packets: namepace packets and subscription packets. The namespace packets are simply a means of defining abbreviations to XML namespaces (called prefixes) which can be referenced by subsequent subscription packets. Subscription packets contain an XPath expression, the querying language for XML documents. For XML namespaces, refer to "Namespaces in XML", W3C Recommendation 14 Jan. 1999, World Wide Web Consortium (W3C) and "Namespaces in XML 1.1", W3C Recommendation 4 Feb. 2004, World Wide Web Consortium (W3C). As an example, the prefix "pref1" might be defined for the XML namespace "www.pref1.com". A subscription might be the XPath expression "/pref1:x/y/", where pref1 is the prefix previously defined. A given XML namespace might be used by a large number of subscriptions being reported by a given XSMP node. To provide a compact representation, an XSMP node assigns a unique prefix string to each unique XML namespace in use, and then uses the prefixes defined for the subscriptions in its XSDB. When a given prefix is no longer needed by any subscriptions, the namespace packet is removed (deleted). Note that in both namespace packets and subscription packets, there is an "addFlag" to allow the namespace or subscription to be added or removed. The contents of the SU message are shown in Table 21 below, and the contents of the SUResp message are shown in Table 22 below.

TABLE 21

Subscription Update Request

| Field | Description |
|---|---|
| senderId | The sending router's id |
| subscriberId | The id of the router (node id) for which the update applies |
| xsdbFirstSeqNum | The sequence number of the first packet in the XSDB row for the subscriberId. |
| xsdbLastSeqNum | The sequence number of the last packet in the XSDB row for the subscriberId. |
| NamespacePacket | There is one NamespacePacket entry for each namespace packet being updated. Each NamespacePacket entry consists of the tuple (addFlag, prefix, namespace, seqNum, prevSeqNum). addFlag is a boolean indicating whether to add or remove the namespace. prefix is the prefix to be associated with the following namespace. namespace is the namespace associated with the prefix. seqNum is the namespace packet's sequence number. prevSeqNum is the sequence number of the preceding update packet (namespace or subscription). |
| SubscriptionPacket | There is one SubscriptionPacket entry for each subscription packet being updated. Each SubcriptionPacket entry consists of the tuple (addFlag, isFilter, subscription, seqNum, prevSeqNum). addFlag is a boolean indicating whether to add or remove the subscription. isFIlter is boolean indicating whether subscription acts as a filter (never forward matches) or not. Filters are never propagated between nodes. subscription is the subscription in the form of an Xpath Expression string. seqNum is the subscription packet's sequence number. prevSeqNum is the sequence number of the preceding update packet (namespace or subscription). |

TABLE 22

Subscription Update Response

| Field | Description |
|---|---|
| senderId | The responding router's id |
| isOk | Boolean value indicating whether the update packets were all processed successfully or not |

In the SU message (Table 21 above), for a removal indication for a Namespace or a SubscriptionPacket (addFlag set to zero), the namespace prefix or the subscription XPE indicates which items (previously added) is to be removed. An alternative implementation is to provide the sequence number of the previously added number to be removed. Note that the removal would still have its own sequence number (indicated by the seqNum field of the NamespacePacket or the SubscriptionPacket tuple. An additional entry (seqNumToDel) to the tuple, present only for a delete operation, would indicate the sequence number to be deleted. If this were done, the fields prefix and namespace would not have to be present when a namespace is deleted, and the field subscription would not have to be present when a subscription is deleted.

The tuple of information in the SubscriptionPacket entry of Table 21 above can be extended to carry other information, including policy information, about the subscription being described. For example, with the entitlement groups feature, as described in co-filed application Ser. No. 60/530,677, if subscriptions are distributed without regard to entitlement groups, a node may match a published document against a subscription from another content router and send a copy of the document to that content router. However, that content router, when carrying out entitlement checks for the matching subscriber, may not allow the document to be sent to the subscriber. Thus, it may occur that a document traverses the network only to be dropped at a destination content router due to an entitlement check. If the entitlement information is sent along with each subscription, the ingress router doing the subscription matching can filter out any matches that do not match the entitlement rules. As another example, a priority indication could be sent along with a subscription, indicating how important a matching document is to the end subscriber. This information can influence the path taken by a matching document to reach the destination content router (for example, using the techniques of leveraging the quality of service available from the underlying network, as described in co-filed application Ser. No. 60/588,797). Thus, the SubscriptionPacket entry can be extended to include policy information to influence the use of the subscription when matching it against published documents.

Figure 9:
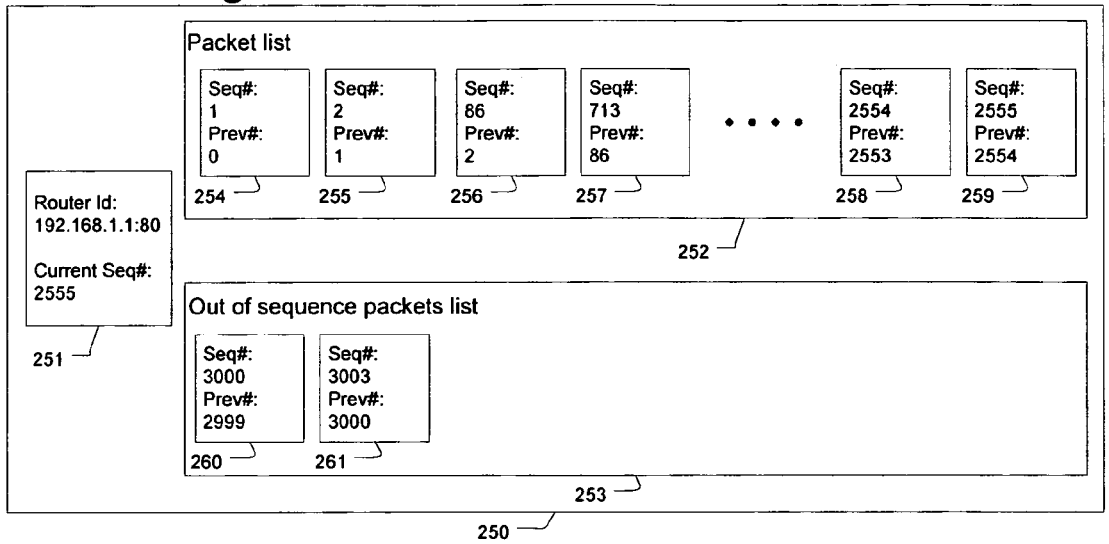
FIG. 9 shows an XSDB row.

The purpose of the XML Subscription Database (XSDB) 54 of FIG. 3 is to make readily available all XSMP update packets (subscription and namespace) for propagation to other XSMP nodes. The database contains the set of sequence numbered XSMP update packets for every XSMP node in the routing area, including itself. As shown in FIG. 9, each XSDB row 250 contains a block 251 which contains information describing the row (specifically the unique routerId for which the row pertains to, and the current sequence number for the routerId). Each row contains a packet list block 252 and an out of order packet list block 253. The packet list block 252 contains the current packet list for the router ID which has been received in order with no missing update packets, while the out of order packet list block 253 contains any update packets which have been received out of order. Packets can arrive out of sequence because of lost messages or topology changes during delivery of the message. In either case out of sequence packets are not processed until the missing packets arrive. Out of sequence packets can be easily identified by examining the new packet's previous sequence number, should that value not match the last packet in the XSDB row 250 then the packet is deemed out of sequence. Note that a previous sequence number of 0, as shown in packet 254, indicates that there is no previous packet. In the packet list 252, the packet 255 can be seen to be the successor of packet 254 since the previous sequence number field of 255 contains a value of 1, which is the sequence number of packet 254. Similarly, the previous sequence number field of packet 256 contains a value of 2 which matches the sequence number of the predecessor packet 255. Note that each packet, such as 254, can either be a namespace packet or a subscription packet as defined above. Packet 256 has a sequence number of 86 and a previous sequence number of 2. This means that sequence numbers 3 through 85 inclusive no longer exist, but did exist at one point. This represents namespace packets and/or subscription packets that did exist at one point but were subsequently deleted. Similarly, packet 257 has a sequence number of 713 and a previous sequence number of 86, so sequence numbers 87 through 712 inclusive no longer exist. Packet 259 is for sequence number 2555, and is the last packet received in-order. The out of sequence packet list block 253 contains two packets: packet 260 (sequence number 3000, previous sequence number 2999) and packet 261 (sequence number 3003, previous sequence number 3000, which also indicates that sequence numbers 3001 and 3002 have been deleted and no longer exist). Since block 252 has a last packet 259 with a sequence number of 2555, which does not match the previous sequence number 2999 of block 260, then one or more packets are missing. Note that a single packet could be missing (with a sequence number of 2999 and a previous sequence number of 2555), or a series of packets could be missing. In block 251, for remote nodes (i.e. the routerId is not this node's routerId), the current sequence number entry indicates the last sequence number that has been received in order. Note that this does not have to match the sequence number of the last packet currently in block 252, as sequence numbers can be assigned and the packet can be subsequently deleted.

The XSDB row for the router's own routerId contains the router's own packets that it wants to advertise to other routers (based on the covering set computed as described above). For that row, the out of order sequence packet list block 253 is always empty. When a new namespace packet or subscription packet is being added to the row (for an addition or a deletion), the current sequence number is incremented and used. Sequence numbers are never re-used, even if packets are subsequently deleted. Sequence numbers are unsigned 64 bit integers; even with an average of one million subscription updates per second (far greater than would actually occur) it would take approximately 580,000 years for the sequence number to roll-over. Thus, sequence number roll-over will never occur and does not have to be handled. Note that sequence numbers are assigned independently by each XSMP node for its updates.

As described above, namespace packets and subscription packets in an SU message can be adds or deletes. A delete packet (corresponding to a delete of a previous add packet) has its own sequence number. For example, a subscription may be added and assigned sequence number 100, and the subscription may be subsequently removed and assigned sequence number 500 (the next available sequence number). The deletion packets need not remain in the XSDB; therefore periodically the XSDB scans each XSDB row and removes the deletion packet along with the corresponding add packet. This removal is what causes gaps in the sequence number as described above. In FIG. 9, if packet list entry 255 is deleted, the previous sequence number for packet list entry 256 changes from 2 to 1.

Whenever changes are made to an XSDB row that are in sequence (i.e. changes placed into block 252, and not changes placed into block 253), the CRIB (55 of FIG. 3) is updated to reflect this new information, and the CRIB updates are propagated to the dataplane (56 of FIG. 3) for document matching. Out of sequence packets (stored in block 253 of FIG. 9) are not used to update the CRIB until the missing sequence numbers arrive, and the packets are moved to the packet list 252. Note that if an entire XSDB row 250 is removed from the XSDB (for example, after debouncing an XSMP node removal as described below), the CRIB is also updated to have all affected subscriptions removed, and the dataplane receives the CRIB updates.

The XSMP running in a content router creates and runs an XSMP Finite State Machine (FSM) instance for each XSMP node detected in the routing area. There are two means of detecting a new XSMP node. The primary method is discovery of a new node via the XLSP protocol (50 of FIG. 3), which can add a new node to the TIB (52 of FIG. 3), and the TIB can notify the XSMP (53 of FIG. 3). The second method is that XSMP can receive a RegNode message even before the XLSP has added the new node to the TIB. In this case a new FSM will also be created, but as explained below, the FSM will wait for the XLSP to declare the node part of the network topology before XSMP processing continues for that node.

Figure 10:
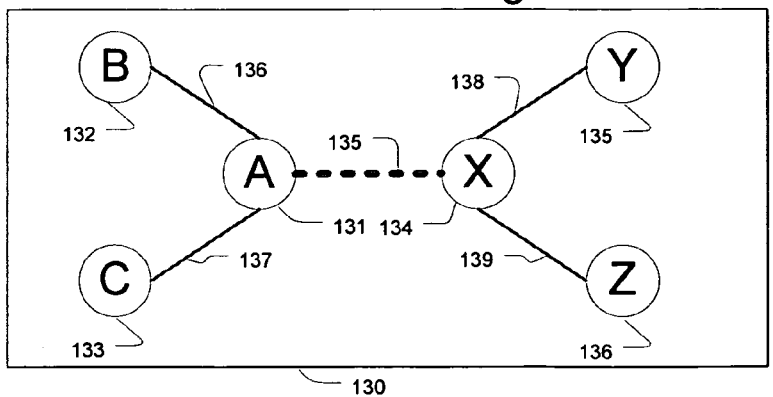
FIG. 10 shows sample XSMP operation.

FIG. 10 shows a sample network topology which will be used to provide an overview of the operation of XSMP. The sample topology contains six XSMP nodes 131, 132, 133, 134, 135, and 136. Initially, link 135 connecting nodes 131 and 134 is not up, creating two islands of XSMP nodes. Nodes 131 and 132 are connected by link 136; nodes 131 and 133 are connected by link 137, and the three XSMP nodes 131, 132 and 133 are fully XSMP synchronized, i.e. each node knows of each other's advertised covering set of subscriptions. Similarly, nodes 134 and 135 are connected by link 138; nodes 134 and 136 are connected by link 139, and nodes 134, 135 and 136 are fully XSMP synchronized. Node 131 will have an XSMP FSM running for each of nodes 132 and 133; node 132 will have an XSMP FSM running for each of nodes 131 and 133; node 133 will have an XSMP running for each of nodes 131 and 132; node 134 will have an XSMP FSM running for each of nodes 135 and 136; node 135 will have an XSMP FSM running for each of nodes 134 and 136; node 136 will have an XSMP running for each of nodes 134 and 135.

Link 135 now becomes operational. As previously described above, the XLSP protocol will run and the LSDB of each of the six content routers (nodes) will become synchronized and the topology will be updated so that each router knows of the other five routers in the network. The XSMP subsystem receives a New Node indication from the TIB for each new node discovered in the network. Nodes 131, 132 and 133 will each discover the new nodes 134, 135 and 136; nodes 134, 135 and 136 will each discover the new nodes 131, 132, and 133. An XSMP FSM is created for each new node on each content router, and an XSMP handshake is carried out to synchronize the XSDB (54 of FIG. 3). The XSMP FSM operates in one of two XSMP handshake modes: a handshake mode for a neighbor and a handshake mode for a non-neighbor. In FIG. 10, node 131 will have a new XSMP FSM $A_X$ running in neighbor handshake mode for node 134 (where FSM $A_X$ means the XSMP FSM for node X running on node A, where the labels A, B, C, X, Y, Z correspond to nodes 131, 132,133, 134, 135 and 136 respectively), and will have new XSMP FSMs $A_Y$ and $A_Z$ running in non-neighbor handshake mode for nodes 135 and 136 respectively. Node 132 will have new XSMP FSMs $B_X$, $B_Y$ and $B_Z$ running in non-neighbor handshake mode for nodes 134, 135 and 136 respectively. Node 133 will have new XSMP FSMs $C_X$, $C_Y$ and $C_Z$ running in non-neighbor handshake mode for nodes 134, 135 and 136 respectively. Node 134 will have a new XSMP FSM $X_A$ running in neighbor handshake mode for node 131, and will have new XSMP FSMs $X_B$ and $X_C$ running in non-neighbor handshake mode for nodes 132 and 133 respectively. Node 135 will have new XSMP FSMs $Y_A$, $Y_B$ and $Y_C$ running in non-neighbor handshake mode for nodes 131, 132 and 133 respectively. Node 136 will have new XSMP FSMs $Z_A$, $Z_B$ and $Z_C$ running in non-neighbor handshake mode for nodes 131, 132 and 133 respectively.

Figure 11:
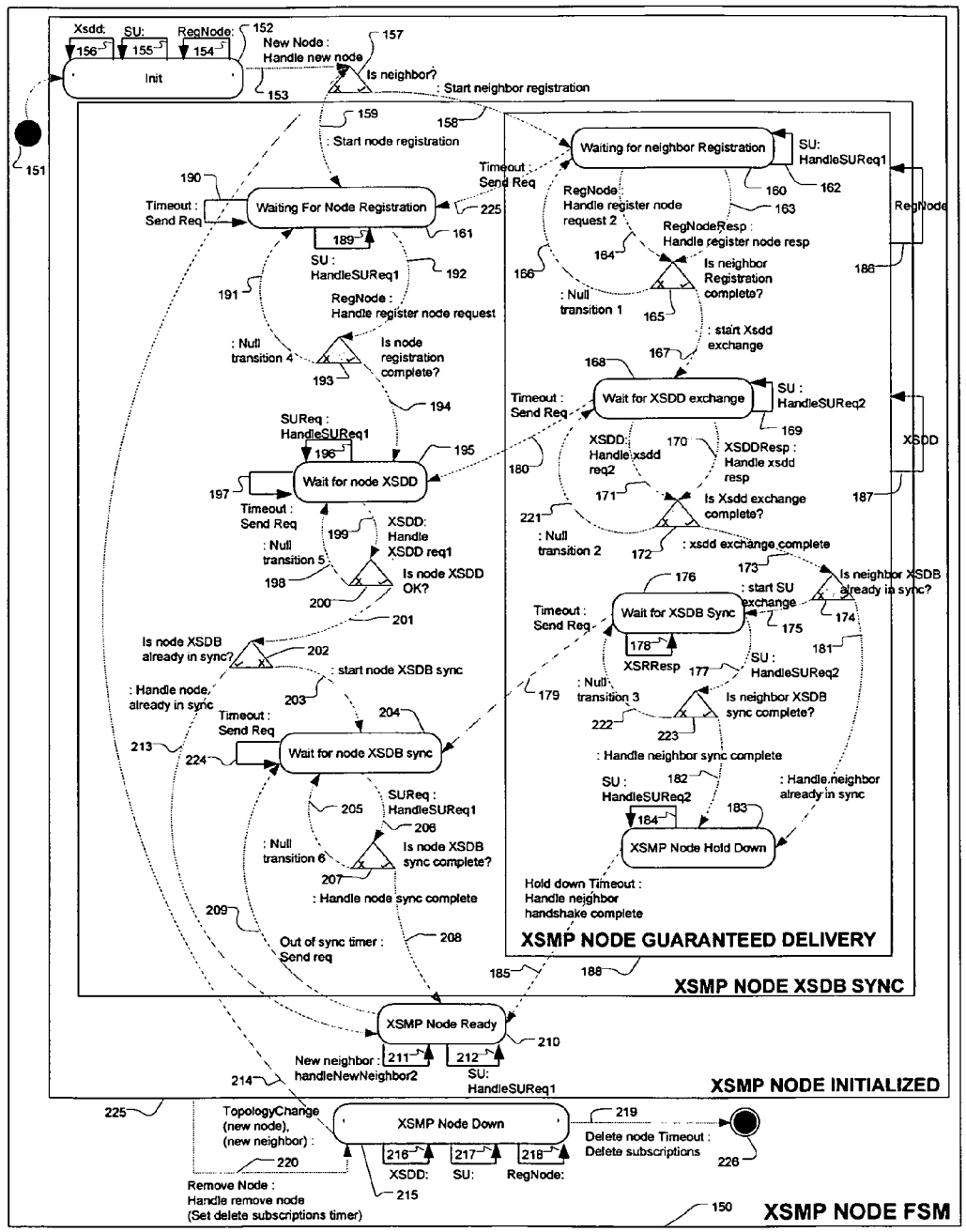
FIG. 11 shows the XSMP node finite state machine.

The neighbor portion of the XSMP state machine will now be described, using $A_x$ as an example. Note that the full XSMP state machine is shown in FIG. 11, and will be described in detail later. The FSM $A_X$ begins by building a list of new nodes $N_{New}$ which have been discovered as a result of node X (node 134). This is the set {Y, Z}, i.e. nodes 135 and 136. $A_X$ also builds a list of well-known nodes $N_{WK}$, which are all nodes other than itself which existed in the topology prior to the topology change. This is the set {B, C}, i.e. nodes 132 and 133. It is $A_X$'s responsibility to ensure that all XSMP handshake messages as well as any other XSMP message received from X are delivered to $N_{WK}$, while the FSM is in the guaranteed delivery (188 of FIG. 11) set of states. $A_X$ must also forward all incoming XSMP messages of any kind to X (node 134), except for messages originating from X. it is also $A_X$ responsibility to deliver all necessary messages such that $N_{New}$ and X can successfully complete their handshakes for nodes A, B and C (nodes 131, 132 and 133) without B (node 132) and C (node 133) having to send a single XSMP message. However, should a message get lost en-route (e.g. from node 131 to nodes 134, 135 or 136), B (node 132) and C (node 133) maybe explicitly requested information from X (node 134), Y (node 135) or Z (node 136); however, those situations will be rare.

Upon entering the Waiting for Neighbor Registration State (160 of FIG. 11), $A_X$ constructs a single RegNode message containing XSMP node information about itself (the senderId) and three nodeId entries (itself and $N_{WK}$) and sends it to X (node 134). Similarly, A (131) should receive a RegNode from $X_A$ containing XSMP node information for nodes X (134), Y (135), and Z (136). This received RegNode message is passed through the XSMP FSMs $A_X$, $A_Y$, $A_Z$ and then forwarded to $N_{WK}$. Note that forwarding a message to $N_{WK}$ means that the XSMP message is addressed to each node in $N_{WK}$ and sent in a multicast fashion. The multicast transmission operates in the same way as was described for the transmission of documents above, i.e. a given message is sent at most once on a given link, and carries a list of one or more destination addresses (as per co-filed application Ser. No. 60/530,677). When an XSMP message is received by a node, if the node's address is in the destination address list, the node removes itself from the destination list and passes the message to the XSMP subsystem. Then, if the destination list is not empty, the node routes the XSMP message forward to the remaining nodes in the destination address list. Note that this can be done in parallel with the XSMP subsystem processing the message. This involves determining the outgoing link for each address in the destination address list, and then sending one copy of the message out each link over which one or more of the addresses are reached, with each message having its destination address list set to the set of addressed nodes which are reachable over the link. This allows an XSMP message to be efficiently flooded to a given set of nodes.

When $A_X$ receives a RegNode message from X (node 134), the XSMP FSM transitions to state Wait For XSDD Exchange (168 of FIG. 11). When entering this state, $A_X$ builds an XSDD message containing a description of the contents of its XSDB (which contains rows for itself and $N_{WK}$) and sends it to X (node 134). Node A should receive an XSDD from X (node 134), containing descriptions for nodes X (134), Y (135) and Z (136). The received XSDD message is passed through the FSMs $A_X$, $A_Y$ and $A_Z$ and then forwarded to $N_{WK}$. $A_X$ will now construct an XSR message in order to request XSMP update packets which are missing from A's (node 131) local XSDB for nodes X (node 134), Y (node 135) and Z (node 136). In most cases, the XSDB will not contain any packets for the new nodes, and all packets (the entire sequence number range for each new node reported in the XSDD) will simply be requested. The XSR message is sent from A (node 131) to X (node 134), and the Wait for XSDB Sync state (176 of FIG. 11) is entered.

IN the Wait for XSDB Sync state (176 of FIG. 11), $A_X$ will continue to await SU messages until the XSDB is in sync with X (node 134). Once the XSDB is synchronized, $A_X$ will transition into the XSMP Node Hold Down state (183 of FIG. 11).

The XSMP Node Hold Down state (183 of FIG. 11) extends the period of time for which node A (node 131) is responsible for the delivery of all packets to $N_{NEW}$. This time is necessary to allow the network to converge for this particular change in topology. After the hold down period, $A_X$ will enter the XSMP Node Ready state (210 of FIG. 11) and the neighbor handshake is complete.

In cases of errors, such as $A_X$ not receiving a NodeReg or an XSDD or all required SU in the required amount of time, $A_X$ requests the missing item and transitions over to the non-neighbor handshake mode.

The non-neighbor portion of the XSMP state machine will now be described, using node C (node 133) as an example, and focusing on its $C_Y$ state machine. The non-neighbor portion of the XSMP FSM passively waits for a RegNode, XSDD and SU messages. Should any of the messages not arrive within a specific period of time, the FSM will send an XSR message requesting the missing information. C (node 133) will receive notification of three new XSMP nodes with ids X (node 134), Y (node 135) and Z (node 136) and will create three FSMs $C_X$, $C_Y$, and $C_Z$ and each will enter the non-neighbor handshake mode in the Waiting for Node Registration state (161 of FIG. 11). C (node 133) will receive a NodeReg message forwarded by A (node 131) containing node information for X, Y and Z (nodes 134, 135 and 136 respectively). Node C (133) will pass this message to each of $C_X$, $C_Y$, and $C_Z$, causing each FSM to transition to the Wait for Node XSDD state (195 of FIG. 11). C will then receive an XSDD message forwarded from node A containing the database descriptions for X, Y and Z. Node C will run this message through FSMs $C_X$, $C_Y$, and $C_Z$. Each FSM will store the database description for the node that it is responsible for (e.g. node X for $C_X$) in case an XSR must be later issued. The FSMs then enter the Wait for XSDB Sync state (204 of FIG. 11). Each FSM will await SU messages until their XSDB entries are up to date. SU messages will arrive as they are forwarded from node A and node C will run these messages through FSMs $C_X$, $C_Y$, and $C_Z$. When all required information has been received, the FSM transitions to the XSMP Node Ready state (210 of FIG. 11) and the non-neighbor handshake is complete.

While in the non-neighbor handshake mode, if required information (such as NodeReg, XSDD, or SU) is not received in the required amount of time, the missing information is explicitly requested to recover. At this point the non-neighbor FSM is actively requesting any missing items instead of passively waiting for information passed on as a result of the neighbor handshake described above.

When the XSMP subsystem (53 of FIG. 3) of a node receives an XSMP message, the message is processed, which may involve invoking one or more of the XSMP FSMs in existence. In addition, the processing may trigger the creation of new XSMP FSM instances. The specific message processing is now described.

When a RegNode message (Table 15 above) is received, the syntax of the message is checked, and a RegNodeResp (Table 16 above) is sent back with isOk set to false in case of an error. Otherwise, the list of nodeId entries in the RegNode message is iterated over. If the node's own unique node id is found, it is ignored in the processing. Otherwise, the XSMP FSM instance is found for the specified nodeId. If one is not found, a new XSMP FSM instance is created for that nodeId. Each XSMP FSM instance found (or created) for the nodeIds listed is invoked with the received RegNode message. A RegNodeResp message is then sent back with isOk set to true.

When a RegNodeResp message (Table 16 above) is received, the syntax is checked, and the message is discarded if an error is found. Otherwise, the XSMP FSM is found for the unique node id of the senderId field. If one is found, it is invoked with the RegNodeResp message. Otherwise, no action is taken.

When an XSDD message (Table 17 above) is received, the syntax of the message is checked, and a XSDDResp (Table 18 above) is sent back with isOk set to false in case of an error. Otherwise, each XsdbRowDescription field entry in the XSDD message is iterated over, looking at the nodeId portion of the tuple. If the node's own unique node id is found, it is ignored in the processing. Otherwise, the XSMP FSM instance is found for the specified nodeId. If one is not found, a new XSMP FSM instance is created for that nodeId. Each XSMP FSM instance found (or created) for the nodeIds listed is invoked with the received XSDD message. A XSDDResp message is then sent back with isOk set to true.

When an XSDDResp message (Table 18 above) is received, the syntax is checked, and the message is discarded if an error is found. Otherwise, the XSMP FSM is found for the unique node id of the senderId field. If one is found, it is invoked with the XSDDResp message. Otherwise, no action is taken.

When an XSR message (Table 19 above) is received, the syntax of the message is checked, and a XSRResp (Table 20 above) is sent back with isOk set to false in case of an error. Otherwise, the XSMP FSM is found for the unique node id of the senderId field. If one is not found, an XSRResp is sent back is isOk set to false and processing stops. If the field reqNodeInfo in the XSR message is true, a RegNode message is constructed, with the node's node id placed in the senderId and the nodeId field, and the RegNode message is sent to the sender of the XSR. Notice that since this was a directed request for information from this node, only this node's information is placed into the RegNode message. If the field reqXsdd in the XSR message is true, an XSDD message is created with the senderId set to this node's node id, and a single XsdbRowDescription is added, containing the nodeId set to this node's node id, and the firstSeqNum and lastSeqNum are filled in to contain the sequence number range for this node in the XSDB. The XSDD message is then sent to the sender of the XSR. Notice that since this was a directed request for information from this node, only this node's information is placed into the XSDD message. Finally, all requested XsmpUpdateRequest entries are processed. For each XsmpUpdateRequest entry (if any are present), the packets for the requested sequence number range (tuple fields firstSeqNum and lastSeqNum) for the specified nodeId are fetched from the XSDB and placed into one or more SU messages. The SU message is optionally limited to a maximum size, which may cause more than one SU message to be generated for a given nodeId. In the SU message, the senderId is set to this node's nodeId, the subscriberId is set to the nodeId from the XsmpUpdateRequest entry, and then the NamespacePacket and/or SubscriptionPacket entries are added to the SU message. Note that not every sequence number requested may exist in the XSDB, but the specification of the previous sequence number for each packet in the SU message allows for sequence number gaps as described above. Once all processing of the received XSR message is completed, an XSRResp is returned to the sender with isOk set to true.

When an XSRResp message (Table 20 above) is received, the syntax is checked, and the message is discarded if an error is found. Otherwise, the XSMP FSM is found for the unique node id of the senderId field. If one is found, it is invoked with the XSRResp message. Otherwise, no action is taken.

When an SU message (Table 21 above) is received, the syntax is checked, and an SUResp (Table 22 above) is sent back with isOk set to false in case of an error. Otherwise, each FSM in existence is invoked with the received SU message. If none of the FSMs found any errors in the message's NamespacePacket or SubscrptionPacket, then a SUResp is sent back with isOk set to true, and otherwise an SUResp is sent back with isOk set to false.

When a SUResp message is received (Table 22 above), if the isOk field in the response indicates that there was a problem with the SU, then the error is logged and alarmed. Additionally, the peering session with the router that reported the error should be torn down.

As mentioned above, the XSMP subsystem 53 of FIG. 3 also reacts to topology changes reported from the TIB 52. When the TIB reports a topology change, the XSMP subsystem 53 determines what effect the topology change has on the XSMP FSMs. First, the XSMP subsystem determines what new nodes have appeared in the topology (if any). For each new node, an XSMP FSM is created, and the new FSM is invoked with a New Node event (e.g. causing transition 153 of FIG. 11 to be followed). Note that a node may appear to be new in the TIB topology, but the corresponding XSMP FSM for the node might already exist, since XSMP message handling as described above can create XSMP FSM instances. In that case, the pre-existing FSM instance is given a New Node event. Then, the set of neighbor nodes in the topology which are not new nodes (since they have already been handled above) are processed. The FSM for any such nodes is invoked with a New Neighbor event. Next, any nodes which previously existed (i.e. an XSMP FSM exists for them) but no longer exist in the topology are handled. Any such XSMP FSMs are invoked with a Remove Node event. Finally, any nodes which used to be a neighbor in the old topology, but are no longer neighbors (but still exist in the new topology) are handled. The XSMP FSM for any such nodes is invoked with a Remove Neighbor event.

The XSMP FSM is shown in FIG. 11, and will now be described in detail. The XSMP FSM 150 uses a timer in various states. The default duration for the various timer duration values is shown in Table 23 below. Note that all XSMP timers are configurable and the values below are only defaults. Additionally, preferentially all XSMP timers are jittered (i.e. the duration is adjusted plus or minus a small random amount when the timer is started).

TABLE 23

Default XSMP Timer Durations

| Timer Duration Name | Default Value (seconds) |
|---|---|
| REGISTRATION_TIME | 30 |
| XSDD_TIME | 30 |
| XSDB_TIME | 30 |
| OUT_OF_SYNC_TIME | 30 |
| XSR_REQUEST_TIME | 30 |
| HOLD_DOWN_TIME | 2 |
| DELETE_NODE_TIME | 1 |

When a new XSMP FSM 150 is created, it starts from initialization point 151 and the Init state 152 is entered. As explained above, the XSMP FSM 150 can be created in response to the XLSP discovering a new node, or a received XSMP message from a new node. In the former case, transition 153 will be immediately followed to leave the Init state 152. In the latter case, the Init state 152 stays active until the XLSP has detected the new node. In the interim, received XSMP messages are queued, and the Init state 152 stays active. This is shown by transitions 154 for a RegNode message, transition 155 for an SU message, and transition 156 for an XSDD message (note that XSMP messages were defined in Table 14 above). Note that normally only a RegNode message, and possibly some SU messages would have to be queued while the Init state 152 is active. A limit is placed on the queue size to ensure that not too many messages are queued. If the queue becomes full, as a new messages arrives the oldest message is discarded. This is done as a security precaution to ensure that a misbehaving XSMP node that is not properly participating in the XLSP node does not cause a large queue of XSMP messages on another content router.

When the New Node event is received (transition 153) indicating that the remote XSMP node for which the FSM is running is now part of the TIB (as determined by the XLSP), a temporary broadcast subscription "//*" is optionally added for the XSMP node for the FSM, and decision point 157 is reached. This decision point determines whether the XSMP node for the FSM is a direct neighbor or not, as determined by the TIB. For example, in FIG. 5 for content router 100, content routers 101 and 103 are neighbors of 100, while content router 102 is not a neighbor. In FIG. 11, if the XSMP node is a neighbor, transition 158 is followed to state Waiting For Neighbor Registration 160, and otherwise state Waiting For Node Registration 161 is entered (via transition 159). Note that the FSM has a series of states within box XSMP_Node Guaranteed_Delivery 188 which is used for the neighbor handshake, and these states are on the right-hand side of FIG. 11. The series of states on the left-hand side are used for the non-neighbor handshake. The FSM now begins the XSMP handshake. The FSM's message queue described above, if not empty, is immediately processed as if the messages just arrived in order. The handling of these messages is described below as part of the various transitions described.

During the time in which the XSDB is not synchronized with a particular XSMP node, potential document matches may be missed for that out-of-sync XSMP node. If this were to happen, the document may not be forwarded to the node and as a result interested subscribers on that node may not receive a document of interest. In order to prevent this, a temporary broadcast subscription "//*" for the XSMP node being synchronized is optionally added during transition 153 to the CRIB (55 of FIG. 3). If this option is selected, then as a result, the XSMP node will receive all documents during the synchronization phase and will not miss any potential matches. Once synchronization is complete (or if synchronization fails), the broadcast subscription is removed (if it was previously added) for the XSMP node.

In FIG. 11, transition 158 (start neighbor registration) starts a timer with duration of REGISTRATION_TIME. As described above, the set of well-known nodes $N_{WK}$ and the set of new nodes $N_{NEW}$ is built using the TIB. A RegNode message is constructed (see Table 15 above), with the senderId field to this node's unique ID, and a nodeId entry is added for each node in $N_{WK}$ as well as the id of the sending node (running the FSM). The RegNode message is sent to the neighbor node. In addition, a copy of the RegNode sent is maintained locally.

In the Waiting for Neighbor Registration state 160, if a RegNodeResp is received, then transition 163 is followed. This transition stores the isOk flag from the response (which indicates whether the neighbor accepted or rejected the RegNode sent). Decision point 165 is then reached. In state 160, if a RegNode message is received, transition 164 is followed. If the message did not come from the neighbor node for which the state machine instance is running, then special processing occurs as follows: the list of nodeIds entries in the RegNode message is iterated over, and if a nodeId is found which is not in the RegNode which was previously sent (i.e. it was not a well-known node at the time), then the nodeId is added to the local copy of the RegNode message previously sent. After iterating, if any such nodeId were found, then the received RegNode message is sent onwards to $N_{NEW}$, but not to any members of $N_{NEW}$ that are the originator of the received RegNode nor to any members that were in the destination list for the received RegNode message (since they will already be receiving a copy). Decision point 165 is then reached. In state 160, if the RegNode is received from our neighbor, the FSM (transition 164) sends the received RegNode message to $N_{WK}$ and records that a RegNode was received from the neighbor. Decision point 165 is then reached. In state 160, if an SU message is received (transition 162), it is not handled by this FSM if the subscriberId is not that of the neighbor, since the FSM is taking care of a specific neighbor router ID. If the subscriberId matches, then the xsdbFirstSeqNum and the xsdbLastSeqNum values are recorded, and the SU is processed, the XSDB is updated with the packets (namespace and/or subscription) in the SU. Finally, in state 160, if the timer expires, transition 225 is followed. This transition starts a timer with duration XSR_REQUEST_TIME, sends an XSR message to the neighbor node with this node as the senderId, and with reqNodeInfo set to true (asking for the missing RegNode message). State Waiting for Node Registration 161 is then entered. At this point the FSM 150 has transitioned out of the XSMP Node Guaranteed Delivery mode 188 due to the timeout in the waiting for neighbor registration phase.

Decision point 165, when reached, determines if the neighbor registration phase is complete or not. This phase is complete if a NodeReg message has been received from the neighbor and a NodeRegResp message has been received with isOk true. If the neighbor registration is not complete, transition 166 is followed and state Waiting For Neighbor Registration 160 remains active. Note that if the registration never completes, the timer explained above will cause recovery action. If neighbor registration is complete, transition 167 is followed, which stops the timer and starts a timer with duration of XSDD_TIME. An XSDD message is created, with the node id as the senderId, and one or more XsdbRowDescription entries to fully describe the XSDB of this node. The XSDD message is sent to the neighbor node, a copy is stored locally, and state Wait for XSDD Exchange 168 is entered.

In state Wait for XSDD Exchange 168, if an XSDDResp message is received, transition 170 is followed. This transition records that an XSDDResp has been received, and records the isOk value. Then, decision point 172 is reached. In state 168, if an XSDD message is received, transition 171 is followed. This transition checks to see if the senderId field in the message is set to the node id of the neighbor node. If not, special handling is done as follows: the XsdbRowDescription entries in the message are iterated over. For each entry, if the nodeId is one which this FSM did not include in the XSDD that it previously sent, then the entry is added to the local copy of the sent XSDD. At the end of the iteration, if new nodeIds were found, then the received XSDD message is sent to all members of $N_{NEW}$, but not to any members of $N_{NEW}$ that are the originator of the received XSDD message nor to any members that were in the destination list for the received XSDD message (since they will already be receiving a copy). Decision point 172 is then reached. In state 168, if the XSDD is received from our neighbor, the FSM (transition 171) saves a local copy of the received XSDD (to later determine if we have received all required database contents), records that a XSDD was received from the neighbor, and sends the received XSDD message to $N_{WK}$. Decision point 172 is then reached. In state 168, if an SU message is received (transition 169), a check is first done to see if the SU came from a member of $N_{NEW}$ (based on the subscriberId field). If so, the SU is sent to all members of $N_{WK}$ that are not already in the destination list of the received SU message. If the SU did not come from a member of $N_{NEW}$, then the SU message must have come from a member of $N_{WK}$, and so it is sent to the neighbor node unless it already appears in the destination list of the received SU message. Transition 169 then checks to see if subscriberId of the received SU message is that of our neighbor, and if so, the xsdbFirstSeqNum and the xsdbLastSeqNum values are recorded, and the SU is processed, the XSDB is updated with the packets (namespace and/or subscription) in the SU. Finally, in state 168, if the timer expires, transition 180 is followed. This transition starts a timer with duration of XSR_REQUEST_TIME, sends an XSR message to the neighbor node with our self as the senderId, and with reqxsdd set to true (asking for the missing XSDD message). State Waiting for Node XSDD 195 is then entered. At this point the FSM 150 has transitioned out of the XSMP Node Guaranteed Delivery mode 188 due to the timeout in the waiting for XSDD exchange phase.

Decision point 172, when reached, determines if the XSDD exchange phase is complete or not. This phase is complete if a XSDD message has been received from the neighbor and a XSDDResp message has been received with isOk true. If the XSDD exchange is not complete, transition 221 is followed and state Wait for XSDD Exchange 168 remains active. Note that if the XSDD exchange never completes, the timer explained above will cause recovery action. If XSDD exchange is complete, transition 173 is followed, which reaches decision point 174.

Decision point 174, when reached, determines whether the neighbor XSDB is already in sync. This is done by checking every XSMP FSM 150 for every member of $N_{NEW}$. For each FSM, a check in the XSDB is done for the row for that particular node id (of the FSM) to see if the current sequence number in the XSDB row matches the last sequence number for that node (as determined by the previously received XSDD message). The current sequence number in each row of the XSDB is stored in block 251 of FIG. 9 as explained above. If the XSDB is fully synchronized, then transition 181 of FIG. 11 is followed, which stops the timer, starts a timer with duration of HOLD_DOWN_TIME, removes the broadcast subscription "//*" (only if previously added as described above), and state XSMP Node Hold Down 183 is then entered. If the XSDB is not already in sync, then transition 175 is followed. This transition starts the SU exchange phase. The timer is stopped, a timer is started with duration XSDB_TIME, and an XSR message is constructed with the senderId set to the node's node id, reqNodeInfo and reqxsdd are both set to false (both have already been received), and one or more XsmpUpdateRequest entries are added to reflect all missing sequence number ranges in the XSDB for all nodeIds in the received XSDD (which was previously stored locally). For example, if the local XSDB does not yet have a row for a new nodeId, the entire sequence number range for that nodeId (firstSeqNum to lastSeqNum from that nodeId's entry in the previously received XSDD) is requested. For nodeIds from the XSDD already in the XSDB, only missing sequence number ranges are requested. The XSR message is then sent to the neighbor, and state Wait for XSDB Sync 176 is entered.

In Wait for XSDB state 176, when an XSRResp message is received, transition 178 is followed, which records that an XSRResp has been received, and records the isOk value. In state 176, when an SU message is received, transition 177 is followed. This transition carries out the SU processing logic described above for transition 169; in addition to this, the timer is stopped and restarted with duration of XSDB_TIME. Decision point 223 is then reached. Finally, in state 176, if the timer expires, transition 179 is followed. This transition starts a timer with duration XSR_REQUEST_TIME, and an XSR message is constructed with the senderId set to the node's node id, reqNodeInfo and reqxsdd are both set to false (both have already been received), and XsmpUpdateRequest entries are added to reflect all missing sequence number ranges in the XSDB for the neighbor nodeId. The XSR message is then sent to the neighbor, and state Wait for Node XSDB Sync 204 is entered. At this point the FSM 150 has transitioned out of the XSMP Node Guaranteed Delivery mode 188 due to the timeout in the waiting for XSDB exchange phase.

Decision point 223, when reached, determines whether the neighbor XSDB sync phase is complete. The algorithm for this check is the same as that already described above for choice point 174 (which checked if we were already in sync with the neighbor XSDB). If the XSDB is fully synchronized, then transition 182 is followed, which stops the timer, starts a timer with duration HOLD_DOWN_TIME, removes the broadcast subscription "//*" (only if previously added as described above), and state XSMP Node Hold Down 183 is then entered. If the XSDB is not synchronized yet, then transition 222 is followed, and state 176 remains active.

In the XSMP Node Hold Down state 183, if an SU message is received, transition 184 is followed, which processes the message in the same manner described above for transition 169. In state 183, when the timer expires, transition 185 is followed to state XSMP Node Ready 210. The XSMP neighbor handshake is now complete.

In XSMP Node Guaranteed Delivery mode 188, there are two more transitions 186 and 187 which apply to the four states 160, 168, 176 and 183 only if a given state does not already handle that event. These transitions do not change the currently active state. Transition 186 (applies to states 168, 176 and 183) handles a received RegNode message. This transition performs the same logic as described for transition 164 above, except that the current state remains active. Transition 187 (applies to states 160, 176 and 183) handles a received XSDD message. This transition performs the same logic as described above for transition 171, except that the current state remains active.

In XSMP Node Ready state 210, if an SU message is received (transition 212), it is not handled by this FSM if the subscriberId is not that of the neighbor, since the FSM is taking care of a specific neighbor router ID. If the subscriberId matches, then the xsdbFirstSeqNum and the xsdbLastSeqNum values are recorded, and the SU is processed, and the XSDB is updated with the packets (namespace and/or subscription) in the SU. Additionally, a check is made to see if there are any out of order packets in the XSDB row that was just updated by the SU message (i.e. in FIG. 9, a check is made to see if the out of order packets list 253 is not empty). If there are out of order packets, then a timer is started (if not already running) with duration of OUT_OF_SYNC_TIME. If there are no out of order packets, then the timer is stopped if was running. In state 210, if a New Neighbor event is received (the generation of this event was described above), transition 211 is followed. This transition takes no action. In state 210, if the timer expires, transition 209 is followed. This transition starts a timer with duration XSR_REQUEST_TIME, and an XSR message is constructed with the senderId set to the node's node id, reqNodeInfo and reqxsdd are both set to false, and an XsmpUpdateRequest entry is added to request the missing sequence numbers from the XSDB row for the node that this FSM represents. The XSR message is then sent to the nodeId that this FSM represents, and state Wait for Node XSDB Sync 204 is entered:

The non-neighbor handshake will now be described in FIG. 11. From decision point 157, if the node is not a neighbor, transition 159 is followed, which starts a timer with duration REGISTRATION_TIME, and enters the Waiting for Node Registration state 161. In state 161, when an SU message is received, transition 189 is followed, and the SU message is processed as described above for transition 162. In state 161, when a RegNode message is received, a copy of the message is saved, and it is recorded that the RegNode message was received. Decision point 193 is then reached (via transition 192). In state 161, if the timer expires, transition 190 is followed. This transition starts a timer with duration XSR_REQUEST_TIME, and creates an XSR message with senderId set to the nodeId of this node, reqNodeInfo set to true (to request the missing RegNode), reqxsdd set to false, and there are no XsmpUpdateRequest entries. The XSR is sent to the node id which this FSM instance represents. State 161 remains active.

Decision point 193, when reached, determines whether node registration is complete. This checks if a valid NodeReg message was received. If not, transition 191 is followed, and state 161 remains active. Otherwise, transition 194 is followed, which stops the timer and then starts a time with duration XSDD_TIME, and state Wait for Node XSDD 195 is entered.

In the Wait for Node XSDD state 195, when an SU message is received, transition 196 is followed and the SU message is processed, in the same manner as already described above for transition 162. In state 195, when as XSDD message is received, transition 199 is followed, which first checks to see if the nodeId for which the state machine instance is running appears as one of the XsdbRowDescription entries in the XSDD. If not, the XSDD message is ignored as it does not pertain to this FSM instance. Otherwise, a local copy of the received XSDD is saved (used for later processing), and the transition records that a XSDD was received. Decision point 200 is then reached. In state 195, if the timer expires, transition 197 is followed. This transition starts a timer with duration XSR_REQUEST_TIME, and creates an XSR message with this node as the senderId, reqNodeInfo set to false (RegNode has already been received), reqXsdd is set to true, and no xsmpUpdateRequests are added. The XSR message is sent to the nodeId which this FSM instance represents, and state 195 remains active.

Decision point 200 determines whether the XSDD is OK or not. If an acceptable XSDD has not been received, transition 198 is followed and state 195 remains active. Otherwise, transition 201 is followed to decision point 202.

Decision point 202 determines whether the XSDB row is already in sync for the nodeId which the FSM instance represents. If the row in the XSDB for the nodeId which this FSM instance represents contains all packet sequence numbers that were reported in the previously received XSDD message, then transition 213 is followed, which stops the timer, removes the broadcast subscription "//*" (only if previously added as described above), and state XSMP Node Ready 210 is then entered. Otherwise, the XSDB is not synchronized yet for the nodeId of interest and transition 203 is followed, which stops the timer, starts a timer with duration XSDB_TIME, and Wait for Node XSDB Sync state 204 is entered.

In Wait for Node XSDB Sync state 204, when an SU message is received, transition 206 is followed. This transition does the same processing as described above for transition 162, and additionally stops and restarts the timer with duration XSDB_TIME. Decision point 207 is then reached. In state 204, if the timer expires, transition 224 is followed, which starts a timer with duration XSR_REQUEST_TIME, and an XSR message is constructed with the senderId set to the node's node id, reqNodeInfo and reqxsdd are both set to false (both have already been received), and XsmpUpdateRequest entries are added to reflect all missing sequence number ranges in the XSDB for the nodeId which this FSM represents. The XSR message is then sent to the nodeId for this FSM instance, and state 204 remains active.

Decision point 207 determines whether the synchronization of the XSDB row for the nodeId which this FSM instance represents is complete. The logic is the same as for decision point 202 described above. If synchronization is not complete, transition 205 is followed and state 204 remains active. Otherwise, transition 208 is followed, which stops the timer, removes the broadcast subscription "//*" (only if previously added as described above), and state XSMP Node Ready 210 is then entered.

Transition 220, which applies to all states within state group XSMP Node Initialized 225 (all states except XSMP Node Down state 215) handles a Remove Node event (which was described above). This transition stops any FSM timer that was running, starts a timer with duration of DELETE_NODE_TIME, and the XSMP Node Down state 215 is entered. State 215 is used to debounce a node disappearing from the topology to see if it is going to re-appear within the duration specified by the timer. In state 215, any received XSDD messages (transition 216), SU messages (transition 217) or RegNode messages (transition 218) are queued for later processing, in the same manner as explained above for Init state 152. If the node re-appears in the topology, either as a new neighbor node or as a new non-neighbor node, transition 214 is followed, stopping the timer and reaching decision point 157 (described above). This will re-start the synchronization handshake. Note that if the XSDB is already synchronized with the node that re-appeared, the handshake will terminate after just the exchange of RegNode and XSDD messages as described above. In state 215, if the timer expires, transition 219 is followed. This transition removes the broadcast subscription "//*" if it had previously been added and not yet removed, and the row in the XSDB for the nodeId which this FSM instance represents is deleted. Final point 226 is then reached, and the FSM instance is deleted, i.e. it no longer exists. This completes the description of the XSMP FSM 150.

Figure 12:
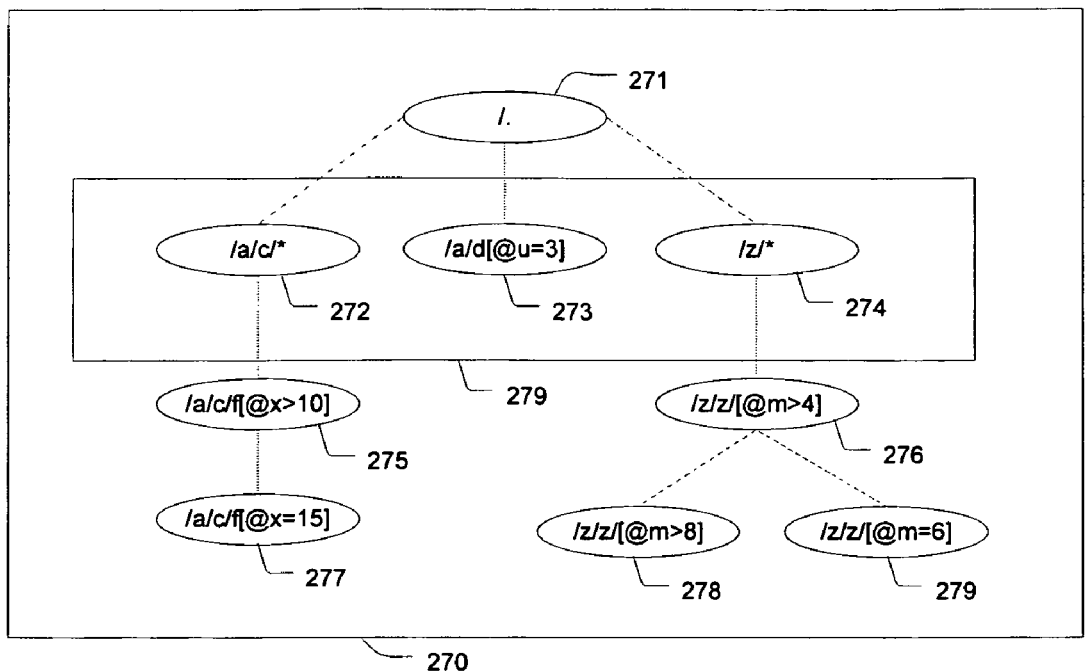
FIG. 12 shows an example covering set tree.

As explained above, a content router preferentially computes a covering set of its local subscriptions for distribution to the other content routers via the XSMP protocol. Table 24 below shows an example set of subscriptions from local subscribers, and FIG. 12 shows a tree which can be built and used to determine the set of subscriptions which must be advertised as the covering set. In FIG. 12, the set of local subscriptions are organized into a covering tree 270. The root element 271 of the tree 270 is always present and does not represent any subscription. The subscriptions are placed into the tree such that any descendents of a given tree element are covered by that element. For example, tree element 276 covers tree elements 278 and 279. This is because any XML document that was a match for the subscription "/z/z[@m>4]" (element 276) could also be a match for the subscriptions "/z/z/[@m>8] (element 278) and "/z/z[@m=6]" (element 279). However, any documents that do not match the subscription of element 276 could not be a match for the subscription of element 278 or of element 279. The set of subscriptions which are direct children of the root element 271 are the covering set 279 (consisting of element s 272, 273 and 274 in the example). Only the subscriptions in the covering set 279 need to be placed into the XSDB row for the XSMP node, and advertised via XSMP. The other subscriptions (represented by elements 275, 276, 277, 278 and 279) are not placed into the XSDB, and will not be advertised to the other routers via XSMP.

TABLE 24

Example Local Subcriptions for Covering Set

| Local Subscriber | Subscription (XPath Expression) |
| --- | --- |
| Subscriber 1 | /z/z[@m>8] |
| Subscriber 1 | /z/z[@m=6] |
| Subscriber 1 | /a/d[@u=3] |
| Subscriber 2 | /z/z[@m>4] |
| Subscriber 3 | /a/c/f[@x=15] |
| Subscriber 3 | /a/c/f[@x>10] |
| Subscriber 3 | /a/c/* |
| Subscriber 4 | /z/* |

Figure 13:
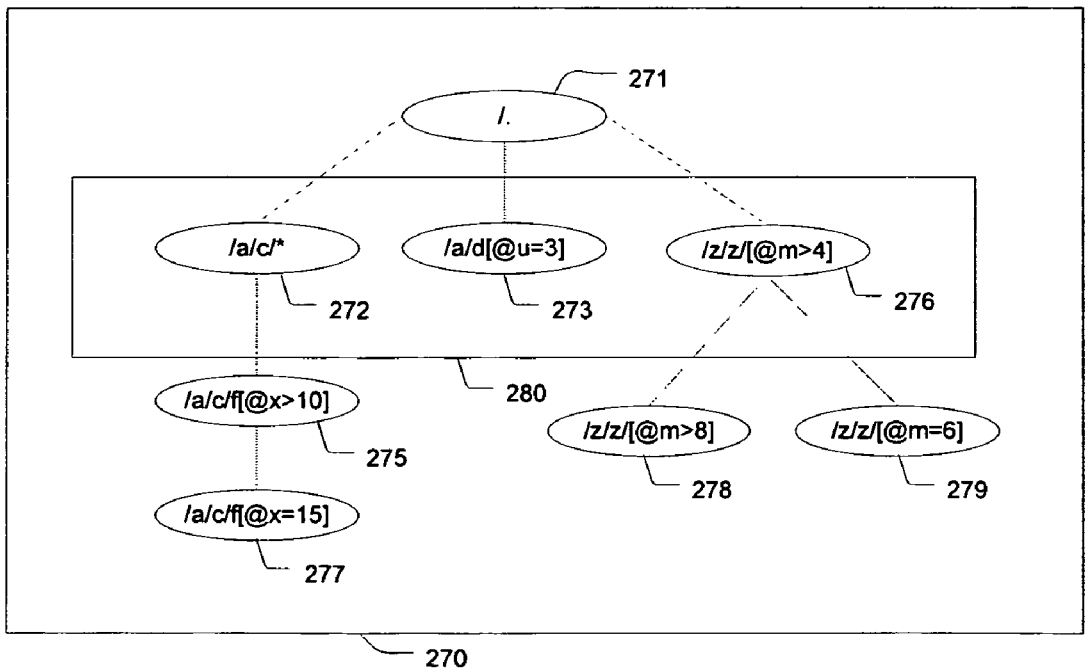
FIG. 13 shows an example covering set tree after subscription removal.

As subscriptions are added and removed by local subscribers, the covering tree 270 is updated, and this may result in changes to the covering set 279. This may result in namespace and subscription changes (adds and deletes) to the XSDB, which are then advertised by XSMP as described above using the SU message. For example, if subscriber 4 were to remove the "/z/*" subscription (element 274), the tree is updated to that of FIG. 13, with a new covering set 280. Note that items in common between FIG. 12 and FIG. 13 share the same label. Due to the subscription removal, element 274 of FIG. 12 is removed, resulting in element 276 now becoming a direct descendent of the root 271. In FIG. 13, the new covering set 280 now contains element 276. As a result, the changes to the covering set are reflected in the XSDB row for the XSMP node; namely the subscription "/z/z[@m>4]" is added and the subscription "/z/*" is marked as removed. This results in two new XSMP subscription packets: an addition of a subscription followed by the removal of a subscription. Note that the sequence is critical: the additions to the covering set must be done before any removals to the covering set. This ensures that as the subscription updates are propagated, at all times the router continues to receive all required matching documents. If the remove was done before the addition, there could be a period of time when the router would not receive a document that matched the subscriptions for tree elements 276, 278 or 279. In this example, if the XSMP node had previously had a last used a sequence number of 100, an SU message would be issued (addressed to all other XSMP nodes in the network in the manner described above) with a lastSeqNum set to 102, and two SubscriptionPacket entries: the first SubscriptionPacket being an add of the XPE "/z/z[@m>4]" with a sequence number of 101 and a previous sequence number of 100; and a second Subscription packet with a delete of the XPE "/z/*" with a sequence number of 102 and a previous sequence number of 101.

Figure 14:
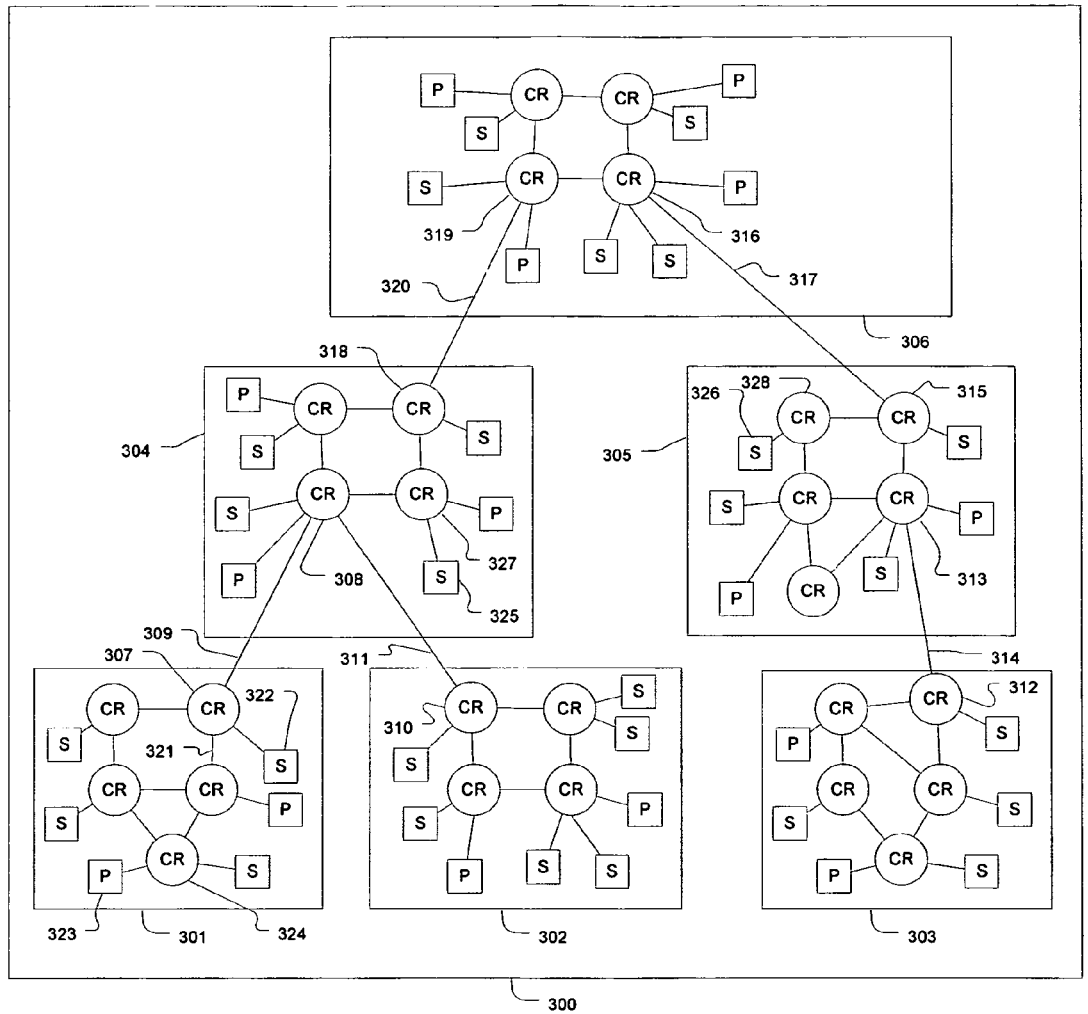
FIG. 14 shows an example of routing areas and tiers.

The scalability of the Implicit Routing Protocol is further enhanced through the support of routing tiers and areas. Routing tiers and areas allow for information summarization among the areas, and allows for the detailed topology within an area to not be exposed to other areas. An example of the use of routing tiers and areas is shown in FIG. 14. In FIG. 14, the content routed network 300 consists of a plurality of routing tiers. In this example network 300, the lowest routing tier consists of a plurality of level 1 routing areas 301, 302, 303; the second routing tier consists of a plurality of level 2 routing areas 304, 305; and the third routing tier consists of a single level 3 routing area 306. Note that there can be more or less routing tiers and routing areas than those shown in FIG. 14. The routing areas are organized in a tree, with the highest level area 306 as the root of the tree and the lowest level areas 301, 302, 303 as the leaves of the tree.

Routing areas at different levels in the routing hieararchy are connected via gateway routers. Area 301 (level 1) and area 304 (level 2) are connected via link 309, and gateway routers 307 and 308. Area 302 (level 1) and 304 (level 2) are connected via link 311 and gateway routers 310 and 308. Note that a gatweway router can serve as a gateway to more than one routing area. For example, router 308 serves as gateway for area 304 to areas 301 and 302. Area 303 (level 1) and 305 (level 2) are connected via link 314 and gateway routers 312 and 313. Area 304 (level 2) and 306 (level 3) are connected via link 320 and gateway routers 318 and 319. Area 305 (level 2) and 306 (level 3) are connected via link 317 and gateway routers 315 and 316. Notice that a routing area can have multiple gateway routers. Area 306 has gateway routers 319 and 316 used to connect to two different level 2 areas 304 and 305 respectively. Area 305 has two gateway routers 315 and 313 to connect to level 3 routing area 306 and level 1 routing areas 303 respectively. Note that a gateway router can have a plurality of publishers and subscribers connected to it like any other router. Note also that publishers and subscribers can exist in any routing area at any routing level. Content routers, such as 324, are denoted by "CR". Publishers, such as 323, are denoted by "P". Subscribers, such as 325, are denoted by "S".

Similar to link state protocols such as OSPF and IS-IS, the use of routing areas allows the topology details of a given routing area to be hidden from the other routing areas. This avoids the need for one large link state database and allows for a scalable solution. IP link state protocols such as OSPF and IS-IS then summarize IP routing information, such as reachable IP prefixes, between areas. In a content-routed network, however, subscription information must be summarized among routing areas.

The XLSP protocol operates as follows to support routing areas and tiers. Each routing area (such as 301) is given a unique areaId. Each routing area is also assigned a routing level, such as level 1 for routing areas 301, 302 and 303. Each router in a given area is provisioned with the areaId and level. This information is communicated in the XLSP NAReq message as shown above. Thus, over a given link, the two routers can determine if the router at the other end of the link is in the same area and at the same level or not. When a link is within a routing area, such as link 321, the XLSP protocol operates as described above.

Inter-area links, such as 309, are provisioned with the expected areaId and level of the routing area the other end of the link. For example, on content router 307, link 309 is provisioned to expect the areaId and level of area 304; on content router 308, link 309 is provisioned to expect the areaId and level of area 301. Since the areaId and level is exchanged between content routers as part of the NAReq message (XLSP handshake), this allows the detection of a link not going to the expected area. Note that an intra-area link, such as 321, does not require this provisioning, as the default is to expect the same areaId and level at both ends of the link. Additionally, such extra provisioning on an inter-area link is not strictly necessary, as the XLSP protocol can still automatically determine that the link is an inter-area link, but without the provisioning there is no detection on whether the area connected to is the expected one.

During the XLSP handshake on an inter-area link such as 309, a gateway router hides the topology of its area from the other area being connected to. In the LSDD sent over an inter-area link, a gateway router only provides its own LSP, and not those of the other routers in the area. For example, across link 309, the LSDD sent by router 307 to router 308 only contains the LSP for router 307; the LSDD sent across link 309 from router 308 to router 307 only contains the LSP for router 308. Thus, for XLSP, an area such as 301 only sees the content router 308 of area 304 and no others. Only gateway router 307 knows that router 308 is in a different area; the other routers in area 301 have no need for this information. The LSP of router 308 will be flooded among the routers in area 301 in the manner described above. Likewise, the LSP for router 307 will be flooded among the routers in area 304. Note that if during the NAReq handshake the expected area and level is not present at the other end of the link, the handshake is rejected and the XLSP link will not come up. Note that a routing area has no XLSP knowledge of any routing areas to which it is not directly connected.

The gateway routers also have a modified role in the XSMP protocol to support a highly scalable content routing solution. It is the job of a gateway router to summarize subscription information to the connected areas, and to serve as a proxy for such subscriptions. Within area 301, XSMP operates as described above, and gateway router 307 will learn of the subscription set (which can be a covering set as described above) from each of the other routers in area 301. Additionally, gateway router 307 knows of its own local subscriptions from local subscribers, such as 322. Gateway router 307 constructs a new covering set which summarizes the subscriptions of area 301, both from other routers within area 301 and the local subscribers of router 307. This covering set is communicated over link 309 to content router 308. This covering set has its own sequence numbering distinct from router 307's own row in the XSDB or of any other row in the XSDB for the other routers of area 301. The XSMP protocol learns from the XLSP protocol that router 308 is in a different area, and so the XSMP handshake operates slightly differently over link 309. The XSDD that router 307 sends over link 309 only contains a single XsdbRowDescription summarizing the covering set for area 301, and providing the nodeId of 307 as the owner of this covering set. Thus, from router 308's perspective, the entire summarized subscription set of area 301 is owned by router 307. In a similar manner, gateway router 310 computes a covering set for all subscriptions in area 302 and communicates this over link 311 to router 308 in area 304; gateway router 312 computes a covering set for area 303 and communicates this over link 314 to router 313 in area 305. In area 306, gateway router 319 computes the covering set for the subscriptions of area 306 and sends this over link 320 to router 318 in area 304; gateway router 316 computes the covering set of area 306 and sends this over link 317 to router 315, etc.

Gateway router 318 in area 304 receives the subscription summary from router 319 and distributes this to the other XSMP nodes in area 304 as described above. To other nodes in area 304, node 319 appears as just another XSMP node with an XSDB row. Gateway router 308 will take this subscription information, along with all other subscription information from area 304, and include it in the covering set computed for area 304 and sent over link 309 to router 307. Thus, the covering set received by router 307 from router 308 will summarize the complete subscription information from the rest of the routing area tree. All nodes in area 301 will simply view router 308 as another XSMP node with an XSDB row. Similarly, router 308 will send the covering set computed to router 310 over link 311. Router 318 summarizes the subscription information for area 304 into a covering set, and this includes the subscription information received from routers 307 and 310, which router 318 views as normal XSMP nodes. This covering set computed thus summarized the subscriptions for areas 304, 301 and 302. This covering set is communicated over link 320 to router 319. Similarly, router 316 computes the summary for area 306, and this includes the summary received from router 318, and thus summarizes areas 301, 302, 304 and 306. This covering set is communicated over link 317 to router 315. Content router 313 will compute the summary for area 305, which includes the covering produced by router 316, and thus will summarize the subscriptions of areas 301, 302, 304, 306 and 305. This covering set is sent over link 314 to router 312. Thus, it can be seen that each area learns a summarized (covering set) view of all subscriptions in all other areas. The use of covering set calculations will greatly reduce the set of subscriptions communicated, due to the overlapping nature of subscriptions in a large content routed network.

Gateway routers also serve a special role when receiving documents being content routed over an inter-area link. Consider a document published by publisher 323 in area 301. Such a document will be content-matched against all subscriptions of all content routers known to router 324, which includes content router 308 and its covering set summarizing the subscriptions for all other areas. Thus, the published document will be addressed to content router 308 there is a subscription match against the covering set provided by content router 308. For example, suppose that the published document matches subscriptions for subscribers 325 (in area 304) and subscriber 326 (in area 305). It will thus be a match against the covering set of router 308 from the viewpoint of area 301. The document is distributed in the manner described above, and router 308 will be included in the destination address list. When router 308 receives the document over link 309, it knows that the document arrived over an inter-area link and thus requires special treatment. Router 308 performs a content match against the document using its CRIB for area 304 (which includes content router 319 and its subscription summary of areas 306, 305 and 303; and content router 310 and its subscription summary of area 302). Note that when this content matching is done, the router at the end of the link on which the document arrived is not included in the matching, i.e. the document is not matched against the covering set of router 307. However, the matching can result in a match against a local subscription on router 308 or another router in the area, including router 319 which is treated as just another XSMP node. In this example, the document will match against router 319 and router 327, and thus the document is addressed to router 319 and router 327. When the document arrives at router 327, it is delivered to subscriber 325. When the document arrives at router 319 over inter-area link 320, it again undergoes content matching as described above, and will be addressed to router 315. When the document arrives at router 315 over inter-area link 317, it will be matched against a subscription for router 328, and thus will be addressed to router 328. When the document arrives at router 328, it is delivered to subscriber 326 and the document delivery is complete.

Static subscriptions are also supported, in order to fulfill a number of functions: support for specifying subscriptions on behalf of attached subscribers via a management interface (e.g. SNMP, CLI, etc.); support for a network operator to manually enter subscriptions which the content router advertises in order to influence the covering set advertised by the router, both within a routing tier and separately at a routing tier boundary. For example, static subscriptions can be entered on behalf of a local subscriber so that matching documents can be delivered to that subscriber. This can be used in place, or in addition to, a protocol that allows a local subscriber to tell the router to which it is attached what its subscriptions are. An administrator can also provision static subscriptions for the entire router, and the router includes these subscriptions in its covering set calculation for its local subscriptions. This can allow the network administrator to influence the covering set calculation. For example, consider distribution of news articles, among many other types of XML content, using an XML format where the outermost XML element is <NewsArticle>. An administrator may decide that a given router should receive all such news content independently of the subscriptions of its local subscribers. A static subscription would be entered on the content router for "/NewsArticle", and this would then cover all related subscriptions. Of course, such a static subscription can be more specific that just an outer XML element. For example, this allows an administrator to be able to control the size of the covering set advertised. Gateway routers can also be provided with static subscriptions to influence the covering set that they produce for advertisement over an inter-area link. Such static subscriptions for this purpose are provisioned on an inter-area link basis on a given content router. This allows for example, content router 308 of FIG. 14 to have different static subscriptions to control the summary sent to area 301 over link 309, vs. the summary sent to area 302 over link 311.

A protocol is also provided to allow a local subscriber to indicate subscriptions to a content router. For example, in FIG. 2, this protocol can be used over link 42 between subscriber 14 and content router 7. This protocol uses three different request/response message pairs as shown in Table 25 below. The protocol is request/response based.

TABLE 25

List of XSMP Subscriber Messages
XSMP Subscriber Messages

| Request | Response |
| --- | --- |
| Add Subscriber Request (ASReq) | Add Subscriber Response (ASResp) |
| Remove Subscriber Request (RSReq) | Remove Subscriber Response (RSResp) |
| Subscribe Request (SRReq) | Subscribe Response (SRResp) |

The ASReq message allows a subscriber to register with a router. Note that the ASReq message also allows another endpoint other than the subscriber to act on behalf of the subscriber, via the senderId field (which can be different than the address of the subscriber). This is similarly true for the RSReq and SRReq messages. The contents of the ASReq message are shown in Table 26 below, and the contents of the ASResp message are shown in Table 27 below. The ASResp message is sent by the router in response to a received ASReq message.

TABLE 26

Add Subscriber Request Message

| Field | Description |
| --- | --- |
| senderId | The sending endpoint's unique id |
| username | The new subscriber's username |
| password | The new subscriber's password |
| address | The new subscriber's network address |
| name | The new subscriber's name |

TABLE 27

Add Subscriber Response Message

| Field | Description |
| --- | --- |
| senderId | The responding router's unique id |
| isOk | Boolean value indicating whether the new subscriber was created or not |

The RSReq message allows a subscriber to de-register with a router. De-registration also automatically removes any subscriptions added by the subscriber. The contents of the RSReq message are shown in Table 28 below, and the contents of the RSResp message are shown in Table 29 below. The RSResp message is sent by the router in response to a received RSReq message.

TABLE 28

Remove Subscriber Request Message

| Field | Description |
| --- | --- |
| senderId | The sending endpoint's unique id |
| username | The subscriber's username |
| password | The subscriber's password |
| subscriberId | The id of the subscriber to remove |

TABLE 29

Remove Subscriber Response Message

| Field | Description |
| --- | --- |
| senderId | The responding router's unique id |
| isOk | Boolean value indicating whether the subscriber was deleted or not |

The SRReq message allows a subscriber to add or delete subscriptions. The contents of the SRReq message are shown in Table 30 below, and the contents of the SRResp message are shown in Table 31 below. The SRResp message is sent by the router in response to a received SRReq message. Note that in the SRReq messages, namespsaces are defined on a per-subscription basis to avoid the subscriber from having to manage a global namespace table as is done between content routers as described above. However, the SRReq message could be extended to allow namespaces to be defined independently of subscriptions as described above if desired.

TABLE 30

Subscribe Request Message

| Field | Description |
| --- | --- |
| senderId | The sending endpoint's unique id |
| subscriberId | The id of the subscriber for which the update applies |
| SubscriptionPacket | There is one SubscriptionPacket entry for each subscription to be added or deleted. Each SubscriptionPacket consists of the tuple (addFlag, isFilter, subscription, (prefix, namespace strings) . . . ). addFlag is a boolean indicating whether to add (1) or remove (0) the subscription. isFilter is a boolean indicating whether subscription acts as a filter (1) or a normal subscription (0). If a document matches a subscriber filter then the document is not forwarded to the subscriber, even if it matches another subscription for the subscriber. Subscription is an XPath Expression (XPE) string for the subscription. Such an XPE can include the use of namespace prefixes as described above. The tuple (prefix, namespace string) is used to bind a namespace string to a namespace prefix as described above, and zero or more of such entries can exist for a given subscription. |

TABLE 31

Subscribe Response Message

| Field | Description |
| --- | --- |
| senderId | The responding router's id |
| isOk | Boolean value indicating whether the subscription packets were all processed successfully or not |

Note that other protocols can be used in place of the protocol defined above, or in addition to it, to allow a subscriber to register with a content router and add and remove subscriptions. For example, the WS-Eventing specification can be utilized. Refer to "Web Services Eventing (WS-Eventing), August 2004, BEA Systems Inc., Computer Associates International Inc., International Business Machines Corporation, Microsoft Corporation, Inc., Sun Microsystems, Inc., TIBCO Software Inc.

Note that the XSMP protocol does not require knowledge of the location of publishers, nor any knowledge of what type of content each publisher will publish, to operate. Publishers can dynamically add and leave the content-routed network with no impact on the XSMP protocol. However, if desired, XSMP could be extended to distribute information on each registered publisher, including the unique publisher id and other information about each publisher.

As an option, the XSMP protocol can use the concept of aging, similar to that described above for XLSP. The XSMP aging mechanism functions as follows. In the XSDB, each row, aside from the row for the nodeId on which the XSDB resides, runs an aging timer for each packet entry. For example, in FIG. 9, a timer is run for each packet list entry such as 254 or 260. This timer has a default duration of 70 minutes. If the timer ever expires for a packet entry, then the packet entry is deemed to be stale and is automatically removed. Each router in the background refreshes their XSMP packets by periodically sending SU messages. Each packet is refreshed periodically with a default duration of 30 minutes, with the timers jittered plus or minus three minutes as described above. A packet is refreshed by re-sending it in an SU message. Note that an SU message can contain a plurality of packets. Upon receipt of a packet which already existed in the XSDB, the aging timer for that packet is restarted with duration of 70 minutes. To conserve bandwidth, a refresh packet in an SU does not need to contain all information. Only the addFlag, seqNum and prevSeqNum fields are required. If an XSMP node receives such a packet and it is new information, then the node can request the full packet information via the XSR message described above.

As an alternative, the XSMP can avoid the use of a new (unique) sequence number when a subscription is deleted. Instead, in the SU message described above (Table 21), when a namespace or a subscription is being deleted (addFlag set to 0), the seqNum can be set to the sequence number being deleted. Additionally, the prefix and namespace (for a NamespacePacket) or the xpe (for a SubscriptionPacket) do not have to be provided for a delete operation. With this scheme, when a namespace or a subscription is deleted, no new sequence numbers are generated. To provide further robustness, the SU message of Table 21 above is extended to include two new fields: checksum and seqNumInUse. The checksum is a 64-bit checksum over the entries that exist for the router id represented by the subscriberId field. This sequence number can be a simple checksum, or a more complex method such as a CRC, MD-5, or other methods known in the art. This checksum would include the sequence number, previous sequence number, prefix and namespace strings (for namespace packets) or xpe (for subscription packets). The numSeqNumInUse field contains the total number of sequence numbers that are currently in use (for both NamespacePackets and SubscriptionPackets). As an example, if a router currently has a xsdbFirstSeqNum of 1 and a xsdbLastSeqNum of 10, and sequence numbers 2 and 7 have been deleted, then numSeqNumInUse would be 8 (since sequence numbers 1, 3, 4, 5, 6, 8, 9 and 10 are still in use). Referring to FIG. 9, the block 251 would be augmented with the checksum and the seqNumInUse computed based on the information in the PacketList 252.

The XSDD message (Table 17) can also have the XsdbRowDescription augmented with the checksum and numSeqNumInUse field. To allow for a background check, instead of using the SU re-transmission method with packet aging described above, another method is to have an XSMP node send its XSDD to all other XSMP nodes (addressing the message to each XSMP node as described above). Each node can run an aging time against each XSDB row, and expect to receive an XSDD update before the timer expires. Upon receipt of the XSDD, the summary of the XSDB row can be verified, using the sequence number range, number of sequence numbers in use, and checksum. If a mismatch is detected, the node then has to determine which entry or entries are in error. One way is to do a full re-synchronization with the XSMP node in question to bring the database row back into sync. Another option is to ask the node for a more detailed summary of the row to determine which packet entries are in error. This can be done as follows. The XSDD message can be further augmented with a new field called XsdbSeqList. This field is the tuple (nodeId, sequence range, sequence range, . . . ). For example, if the sequence numbers currently in use are 1, 3, 4, 5, 6, 8, 9 and 10, this tuple would contain (nodeId, 1-1, 3-6, 8-10), where an entry such as 8-10 indicates that sequence numbers 8 through 10 inclusive are in use. When as XSDD message is explicitly requested from a node via the XSR message, the XSDD message sent as a result would contain the XsdbSeqList in addition to the other information. The node receiving this XSDD can then delete any sequence numbers that it has that it should not, and if it is missing information for a sequence number(s), the missing packets can be requested via another XSR message as explained above. If all sequence numbers match and the checksum still does not match, then the contents of one of the packets stored in the XSDB must be corrupted, and an entire XSDB synchronization for the row is carried out to correct the problem. With this refresh scheme, a node could choose to send an XSDD without the XsdbSeqList on a timed basis, for example, every 30 seconds, and to send an XSDD with the XsdBSeqList on a much less frequent timed basis, e.g. every 30 minutes, to allow the receiving nodes to do a full sequence number audit.

The XLSP protocol acts as an interior gateway protocol to discover and maintain the topology of the network (which may be a content-routing overlay network). The XSMP protocol runs in concert with the XLSP protocol and takes care of distributing a potentially large number of subscriptions, using the XML multicast capability provided by the forwarding layer as described above. Another technique which can be used to enable implicit routing is to adapt an existing IGP protocol such as OSPF or IS-IS. Using OSPF as an example, OSPF can determine the topology of the network as is known in the art. If an overlay XML network is being used, OSPF can be run in an overlay fashion directly between content routers to just detect the topology of the overlay network (using techniques such as IP tunneling through the underlying network). Or, when the XML layer and the underlying network are combined, OSPF can be used for both layers simultaneously. The OSPF Opaque LSA Option (refer to RFC 2370, "The OSPF Opaque LSA Option", July 1998, The Internet Society, the contents of which are herein incorporated by reference) can be used to carry opaque Link State Advertisements (LSAs) containing application-specific information, in this case information required for implicit routing, such as XPath Expressions (XPEs), as described earlier for XSMP.

Figure 15:
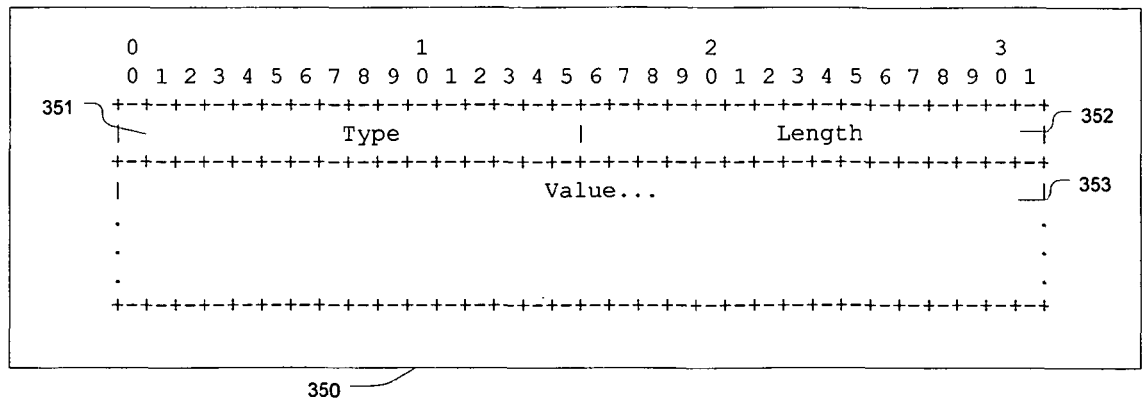
FIG. 15 shows TLV Structure.

As an example of the use of Opaque LSAs (refer to RFC 2370 for the meaning of each Opaque LSA field referred to below), a new Opaque Type value is assigned (either through allocation of a new code point via the Internet Assigned Numbers Authority (IANA), as is known in the art, or by use of one of the code points in the range of 128 through 255 inclusive, which are reserved for private and experimental use. A different Opaque Type value is assigned for each type of implicit routing, such as XML implicit routing, to allow multiple types of implicit routing to co-exist. The assigned Opaque Type for XML routing is used to advertise XML namespace to prefix bindings (similar to the NamespacePacket described above) and to advertise subscriptions (similar to the SubscriptionPacket described above). The 24 bit Opaque ID is used to carry the identifier of a specific Opaque LSA, which allows multiple implicit routing LSAs to be maintained for a given Advertising Router of the Opaque LSA. This allows each Advertising Router to advertise a maximum of 16777216 implicit routing LSAs (namespace or subscription) per Opaque Type. The Opaque LSA type is 10, which denotes area local scope. The Opaque Information carried by the Opaque LSA consists of one or more nested Type/Length/Value (TLV) triplets for extensibility (where a nested TLV is referred to as a sub-TLVs). FIG. 15 shows an example TLV 350 structure used, with a 16-bit Type 351, a 16-bit Length 352, and a variable sized Value 353. The Length 352 defines the length of the Value 353 in octets; a TLV with no Value 353 portion has a Length 352 of zero. The TLV 350 is padded to four-octet alignment; padding is not included in the length field (so a three octet Value 353 would have a Length 352 of three, but the total size of the TLV 350 would be eight octets). Nested TLVs (carried in the Value 353 of a parent TLV) are also 32-bit aligned. There are two top-level TLVs defined: the namespace TLV (Type of 1) and the subscription TLV (Type of 2). The Namespace TLV is used to advertise a namespace prefix to namespace mapping. There are two sub-TLVs defined for the namespace TLV, as shown in Table 32 below.

TABLE 32

Namespace TLV Sub-TLV Definitions for Opaque LSA

| Sub-TLV Type | Description |
| --- | --- |
| 1 | The prefix name string. |
| 2 | The namespace string associated with the prefix. |

The Subscription TLV is used to advertise a subscription, in the form of an XPath Expression as described above. There are two sub-TLVs defined for the subscription TLV, as shown in Table 33 below. Note that as described above, additional sub-TLVs can be added to carry other information associated with a subscription, such as Entitlement Groups or priority.

TABLE 33

Subscription TLV Sub-TLV Definitions for Opaque LSA

| Sub-TLV Type | Description |
| --- | --- |
| 1 | Boolean (1 octet value) indicating if the subscription is a filter (value of 1) or not a filter (value of 0). |
| 2 | The string of the XPath Expression for the subscription, which may include namespace prefixes from the Namespace TLV. |

The Opaque LSAs described above can then be advertised by an Advertising Router, or retracted by an Advertising Router, as is known in the art. This allows each router participating in the implicit routing protocol to learn of all namespace definitions and subscriptions for the area in order to build its XSDB. Multiple OSPF areas can be used, as is known in the art, to increase scalability. Note that the subscriptions advertised by an Advertising Router can be the result of a covering set aggregation as described above. Thus, the use of opaque LSAs of OSPF can be used to distribute XML subscriptions to enable implicit routing as an alternative to the XSMP protocol defined above.

Even if an IGP protocol such as OSPF or IS-IS is not used to distribute namespaces and subscriptions, it could be used in place of XLSP to determine the network topology, and then XSMP can be used to distribute namespaces and subscriptions. If the XML content-routed network still supports XML multicast message delivery as defined above, XSMP can use this capability; otherwise it must revert to replicating messages in order to deliver a message to a number of destinations, or use another technique such as IP multicast if supported by an underlying network. Note that if an overlay topology network is not used between content routers but rather the content router network topology is integrated with the topology of the underlying IP network, then an Opaque LSA could be used to allow content based routers to declare themselves and find each other (but not to carry subscription information), so the content routers can differentiate themselves from other (e.g. IP only) routers that are participating in the OSPF protocol. This would then allow for automatic creation of adjacencies between content routers where the adjacencies are formed in a manner that is efficient for data transfer due to content router having knowledge of the topology of the IP network. In this case, use of Link-State type 11 may be desirable to allow content routers anywhere inside an OSPF network to find each other—even if they are not in the same OSPF area.

The use of Opaque LSAs with OSPF is suitable for small networks, but OSPF is known not to scale gracefully for a large number of internet prefixes (e.g. for IPv4 routing), and the distribution of a large number of namespace and subscriptions is a more difficult problem. Thus, the technique described above is suitable for smaller scale deployments, but not for deployments involving millions of subscriptions.

Figure 16:
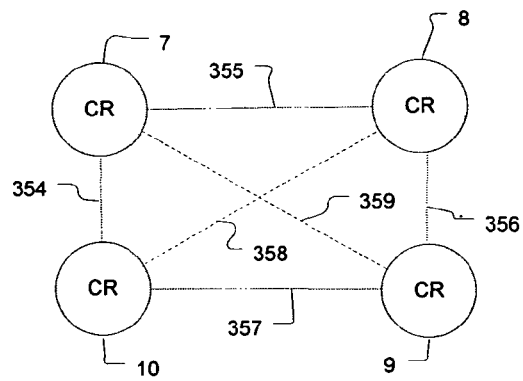
FIG. 16 shows XSMP Full Mesh Peering.

As described above, the XSMP protocol relies on the underlying XML multicast capability, and uses both a neighbor and non-neighbor handshake to efficiently synchronize and update the XSDB. An alternative technique which can be used is to fully mesh the XSMP nodes for the purpose of XSMP peering. This would be done using a TCP connection between each pair of XSMP peers. This TCP connection would only be used for the XSMP protocol. For example, consider the content-routed network of FIG. 2, consisting of the four content routers 7, 8, 9 and 10 (each of which is an XSMP node). A separate set of TCP connections can be used to fully mesh these XSMP nodes for the purpose of the XSMP protocol This is shown in FIG. 16 (only elements relevant to the inter-node XSMP protocol are shown), with labels in common with FIG. 2 shared. In FIG. 16, there exits a full mesh of connections between the four content routers (each of which is an XSMP node) 7, 8, 9 and 10, shown by connections 354, 355, 356, 357, 358 and 359. For example, content router 7 and 8 are connected by connection 355 for the purpose of the XSMP protocol peering between them. This approach is similar to the approach used for peering in the Border Gateway Protocol (BGP). For BGP, refer to RFC 1771, "A Border Gateway Protocol 4 (BGP-4)", March 1995, The Internet Society, the contents of which are herein incorporated by reference). Each XSMP node, such as 7, is responsible for carrying out an XSMP handshake and exchanging their XSDB row related to their own node. Note that over connection 355, node 7 tells node 8 about its covering set for its local subscriptions, and node 8 tells node 7 about its covering set for its local subscriptions. Node 7 is not responsible for telling node 8 about the subscriptions related to any other XSMP node (such as node 9 or node 10). Node 8 is not responsible for telling node 7 about the subscriptions related to any other XSMP node (such as node 9 or node 10). Node 7 peers with Node 10 over link 354, with node 8 over link 355, and with node 9 over link 359. Thus, a given XSMP node builds up its XSDB by peering separately with each XSMP node in the XSMP area. XSMP area gateway routers, as described above, are additionally responsible for distributing the covering set of the area at the other end of the gateway link as previously described to each XSMP node to which it is peering.

Note that with the above approach, the topology used for the XSMP topology, shown in FIG. 16 (e.g. over connections 354 through 359) is completely separate from the topology used for the dataplane (i.e. sending of XML documents being content routed, over links 43, 44, 45 and 46 of FIG. 2).

An advantage of the full mesh XSMP peering approach is that it simplifies the XSMP state machine. However, such a full-mesh approach is only suitable for an area with a few XSMP nodes.

Figure 17:
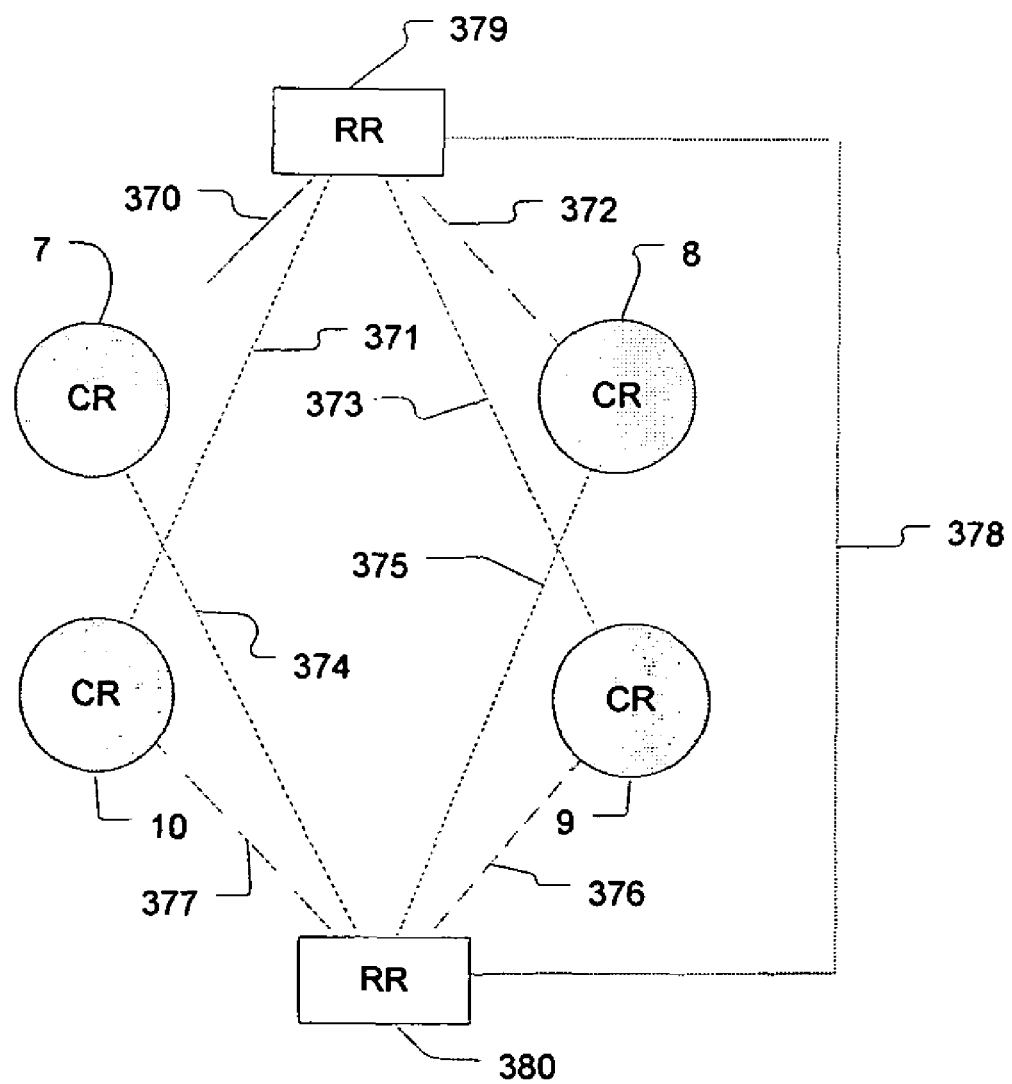
FIG. 17 shows Use of Route Reflectors.

Another technique which could be used is the use of XSMP Route Reflectors, in a manner similar to BGP Route Reflectors as is known in the art. For BGP Route Reflectors, refer to RFC 1966. "BGP Route Reflection An Alternative to Full Mesh IBGP", June 1996, The Internet Society, the contents of which are herein incorporated by reference; and RFC 2796, "BGP Route Reflection—An Alternative to Full Mesh IBGP", The Internet Society, the contents of which are herein incorporated by reference. For the example content routed network of FIG. 2, the XSMP network utilizing XSMP Route Reflectors is shown in FIG. 17 (which shares labels in common with FIG. 2). In FIG. 17, there are two XSMP Route Reflectors 379 and 380. Two Route Reflectors are used for redundancy. Each Route Reflector is fully meshed with each XSMP node 7, 8, 9 and 10. XSMP node 7 connects over connection 370 to Route Reflector 379, and over connection 374 to Route Reflector 380. XSMP node 8 connects over connection 372 to Route Reflector 379, and over connection 375 to Route Reflector 380. XSMP node 9 connects over connection 373 to Route Reflector 379, and over connection 376 to Route Reflector 380. XSMP node 10 connects over connection 371 to Route Reflector 379, and over connection 377 to Route Reflector 380. The two Route Reflectors 379 and 380 connect to each other over connection 378. Each connection can, for example, be a TCP connection. The XSMP Route Reflector is responsible for peering with each XSMP node, and for reflecting all XSMP route information (i.e.

namespaces and subscriptions) to all other XSMP nodes. For example, Route Reflector 379 peers with XSMP node 7. All XSMP information learned from XSMP node 7 by Route Reflector 379 is then passed on to content routers 8, 9 and 10 through Route Reflector 379 peering with them. Thus, each XSMP node will learn of the subscriptions (covering set) for all other XSMP nodes in the area, but the Route Reflectors 379 and 380 take on the burden of supporting a large number of peering sessions and a large amount of XSMP traffic replication and distribution. This provides a more scalable solution than the full mesh peering model of FIG. 16. In FIG. 17, connection 378 between the Route Reflectors 379 and 380 is used to allow the Route Reflectors to communicate and to elect which should be the active Route Reflector and which should be the standby. An XSMP node, such as 7, is responsible for peering with both Route Reflectors. However, generally only the active Route Reflector will reflect routes to the XSMP nodes with which it is peering.

Another technique which can be used for subscription propagation in a content-routed network is to use the BGP protocol (running as an internal BGP, or IBGP as is known in the art). To do this, the multiprotocol BGP extensions are used; refer to RFC 2858, "Multiprotocol Extensions for BPG-4", June 2000, The Internet Society, the contents of which are herein incorporated by reference. In addition, BGP capability advertisement is used; refer to RFC 3392, "Capability Advertisement with BGP-4", November 2002, The Internet Society, the contents of which are herein incorporated by reference. The Network Layer Reachability Information (NLRI) in the BGP Multiprotocol Extensions Attribute is used to carry the namespace and subscription information. Specifically, the Multiprotocol Reachable NLRI (MP_REACH_NLRI) and the Multiprotocol Unreachable NLRI (MP_UN-REACH_NLRI) are used, as per RFC 2858. In the NLRI attribute, the Address Family Identifier (AFI) is assigned a new code point (assigned by IANA) to reflect XML. Other code points can be assigned for other types of content routing. The Subsequent Address Family Identifier uses pre-existing code point 3 (Network Layer Reachability Information used for both unicast and multicast forwarding). Or, as an alternative, a new SAFI code point can be assigned (via IANA), or a SAFI code point in the range of 128 to 255 inclusive can be used (which are reserved for private use). The Network Layer Reachability Information field is encoded is a different manner to RFC 2858 due to the need to carry large subscription information units (namespaces and subscriptions). The NLRI carries a sequence of TLV encoded information to encode one or more namespace and subscription entries. The TLV format is similar to that described above for the OSPF Opaque LSA, but an extra sub-TLV is defined to carry a 32-bit unique number. This allows each namespace (TLV type of 1) or subscription (TLV type of 2) advertised to be given a unique number. Only this unique number need be specified as a sub-TLV in the subscription or namespace TLV in the NLRI of the MP_UNREACH_NLRI attribute. This avoids having to send large subscription or namespace string information for withdrawals. However, the use of the unique number sub-TLV is optional; without it, the full specification of the namespace (only the prefix is needed) or the subscription is needed for withdrawal. Note that the BGP Update message is used to carry the MP_REACH_NLRI and MP_UN-REACH_NLRI attributes.

The Namespace TLV is used to advertise a namespace prefix to namespace mapping. There are three sub-TLVs defined for the namespace TLV, as shown in Table 34 below.

TABLE 34

Namespace TLV Sub-TLV Definitions for NLRI

| Sub-TLV Type | Description |
|---|---|
| 1 | The prefix name string. |
| 2 | The namespace string associated with the prefix. |
| 3 | The 32 bit unique number for this namespace definition. |

The Subscription TLV is used to advertise a subscription, in the form of an XPath Expression as described above. There are three sub-TLVs defined for the subscription TLV, as shown in Table 35 below. Note that as described above, additional sub-TLVs can be added to carry other information associated with a subscription, such as Entitlement Groups.

TABLE 35

Subscription TLV Sub-TLV Definitions for NLRI

| Sub-TLV Type | Description |
|---|---|
| 1 | Boolean (1 octet value) indicating if the subscription is a filter (value of 1) or not a filter (value of 0). |
| 2 | The string of the XPath Expression for the subscription, which may include namespace prefixes from the Namespace TLV. |
| 3 | The 32 bit unique number for this subscription definition. |

A BGP speaker that supports the content routing extensions defined above should use the Capability Advertisement procedures (refer to RFC 3392) to advertise this capability. The fields of the Capabilities Optional Parameter are set as per RFC 2858 to indicate each <AFI, SAFI> tuple supported. The new <AFI, SAFI> tuple defined above for XML implicit routing is advertised along with other supported <AFI, SAFI> tuples.

When BGP is used in a network of content routers (such as that shown in FIG. 2), full mesh BGP peering can be used. This scheme is similar to that described above for full mesh XSMP peering (FIG. 16). For BGP, referring to FIG. 16, each content router 7, 8, 9 or 10 is a BGP speaker, and the connections used to fully mesh the BGP speakers, such as connection 354 between BGP speaker 7 and BGP speaker 10, is used to carry the BGP protocol, with the extensions defined above to support distribution of subscriptions for content routing. Alternatively, BGP Route Reflectors can be used to avoid each content router having to be a BGP peer with every other content router. For example, in FIG. 17, when using BGP, Route Reflectors 379 and 380 would be BGP Route Reflectors, and would peer with each of the content routers 7, 8, 9 and 10. In addition, the BGP Route Reflectors 379 and 380 would communicate with each other over link 378. The operation of BGP Route Reflectors is known in the art.

Note that with the option of using an IGP protocol such as OSPF (with opaque LSAs), or the modified XSMP protocol with full mesh connectivity or with XSMP Route Reflectors, or the use of BGP protocol with full mesh connectivity or the use of BGP Route Reflectors, the XML content routing dataplane can still utilize the XML multicast capability described above to efficiently address an XML document to one or more content routers which have matching subscriptions. The distribution of subscriptions is still based on having each content router compute a covering set of its subscriptions, and distributing this to every other content router (perhaps through a Route Reflector). Thus, a change of topology does not affect the subscriptions distributed, as opposed to the prior art as explained earlier. Techniques such as the use of multiple areas and hierarchy can still be utilized for large scale content-routed networks.

Reference has been made herein to copending provisional applications, which are incorporated by reference. Such incorporation by reference should also be taken to include the non-provisional applications based thereon whose serial numbers will be inserted when they become available.

It will be appreciated by persons skilled in the art that many variants of the invention are possible.

All references mentioned above are herein incorporated by reference.

We claim:

1. A method of managing a content-based network having a plurality of network elements interconnected by links, comprising:
   maintaining each said network element's topological view of the network using a link state protocol;
   using a subscription management protocol to distribute subscription information in a manner that is independent of network topology;
   using said subscription management protocol to identify which network element or elements need a given published document;
   using said link state protocol to compute a path to the identified network element or elements; and
   forwarding said given published document over said path computed by said link state protocol;
   whereby redistribution of subscription information is not required as a result of a change in said network topology.

2. The method of claim 1, wherein said content based network is implemented as an overlay network on an underlying network.

3. The method of claim 2, wherein said underlying network is IP based, said network elements are routers, and said overlay network is XML based.

4. The method of claim 1, wherein said link state protocol has one or more responsibilities selected from the group consisting of: Neighbor acquisition and discovery; Compute link costs; Distribute its topological view of the network; Identify node/link failures; Compute current topology graph; and reliably forward/flood new topology information learned from neighboring routers in such a manner as to ensure that all XLSP nodes have synchronized XLSP topology databases.

5. The method of claim 1, wherein said subscription management protocol has one or more responsibilities selected from the group consisting of: subscriber management synchronization, synchronization of subscription management protocol nodes in a routing area, support for inter-area links, subscription propagation, and content routing information base updates.

6. The method of claim 1, wherein one or more of said link state protocol and said subscription management protocol is XML based.

7. The method of claim 1, wherein said network elements are XML routers, and said link state protocol contains methods for discovering the complete topology of said XML Routers (all nodes, links and link costs) in said overlay network.

8. The method of claim 1, wherein said link state protocol also carries other policy information about each link.

9. The method of claim 1, wherein said link state protocol and said subscription management protocol impose a hierarchy into the content routed network by the creation of "areas" and "tiers" to facilitate scalability.

10. The method of claim 1, wherein the subscription management protocol contains methods to auto-detect and broadcast the presence of publishers to all content routers in the network.

11. The method of claim 1, wherein the subscription management protocol contains methods to allow end devices to register and de-register subscribers and add and remove subscriptions.

12. The method of claim 1, wherein the subscription management protocol contains methods to add and delete subscriptions to/from other routers.

13. The method of claim 12, wherein the subscription management protocol contains methods to distribute policy information about each subscription.

14. The method of claim 1, wherein subscription management protocol allows for support of equal cost multipath.

15. The method of claim 1, wherein as a portion of a refresh process, the subscription management protocol contains a method for bandwidth compression of the subscription refresh messages.

16. The method of claim 1, wherein the subscription management protocol contains methods to aggregate multiple subscriptions into a single subscription entry.

17. The method of claim 1, wherein the subscription management protocol contains methods to manage subscribers, subscriptions and publishers in the presence of areas and tiers defined by the XML link state protocol.

18. The method of claim 1, wherein said subscription management protocol is an IP routing protocol adapted for implicit routing.

19. The method of claim 1, wherein said link state protocol is an IP routing protocol adapted for implicit routing.

20. The method of claim 1, wherein content routing information is distributed using OSPF or IS-IS.

21. The method of claim 1, wherein the content-based network is an overlay network, the topological view of the network is discovered using OSPF or IS-IS as the topology discovery protocol, and subscription information is distributed in another manner.

22. The method of claim 1, wherein the content-based network is an overlay network, the topological view of the network is discovered, and subscription information is distributed, using OSPF or IS-IS.

23. The method of claim 1, wherein OSPF or IS-IS is used alone in an overlay network to distribute both topology and subscription information.

24. The method of claim 1, wherein OSPF or IS-IS is employed in an integrated topology mode to allow content routers to find each other and establish links to each other.

25. The method of claim 1, wherein fully meshed XSMP nodes are employed for subscription distribution, each XSMP node informing every other XSMP node directly in an area of its subscriptions.

26. The method of claim 1, wherein BGP is used to distribute content routing information.

27. The method of claim 26, wherein BGP route reflectors are employed.

28. The method of claim 1, wherein XSMP route reflectors are employed.

29. The method of claim 1, wherein said network elements are content routers, and a local content router upon receiving a given published document with a destination address list, identifies, independently of any local subscriptions, any content routers to which said given published document is addressed and forwards said given published document to said addressed content routers.

30. The method of claim 29, wherein said local content router, upon receiving a given published document with a destination address list, attempts to match the address of said local content router against the destination address for said given published document, and in response to a match performs matching of any local subscriptions for said document.

31. A method of managing a content-based overlay network on an underlying network having a plurality of network elements interconnected by links, comprising:
   maintaining each said network element's topological view of the overlay network from the underlying network using a link state protocol;
   disseminating subscription information within said content-based overlay network using a subscription management protocol in a manner that is independent of network topology; and
   distributing published content over said overlay network in accordance with said subscription information.

32. A method of managing a content-based network partitioned into areas comprising:
   within a given area, matching a document against network subscriptions on ingress to the area; and
   explicitly addressing said document to all egress destination routers within said area.

33. A router for use in a content-based network having a plurality of network elements interconnected by links, comprising:
   a link state subsystem for exchanging protocol messages with other routers using a link state protocol;
   a link state database for storing link state information;
   a topology information database for maintaining a topological view of the network; and
   a subscription management subsystem for exchanging protocol messages with other routers to disseminate subscription information about within said content-based network, said subscription management protocol distributing subscription information in a manner that is independent of the network topology; and
   wherein said link state subsystem is configured to discover and maintain a network topology information database independently of said subscription management protocol.

34. The router of claim 33, wherein said link state protocol has one or more responsibilities selected from the group consisting of: Neighbor acquisition and discovery; Compute link costs; Distribute its topological view of the network; Identify node/link failures; Compute current topology graph; and reliably forward/flood new topology information learned from neighboring routers in such a manner as to ensure that all XLSP nodes have synchronized XLSP topology databases.

35. The router of claim 33, wherein said subscription management protocol has one or more responsibilities selected from the group consisting of: subscriber management synchronization, synchronization of subscription management protocol nodes in a routing area, support for inter-area links, subscription propagation, and content routing information base updates.

36. The router of claim 33, wherein one or more of said link state protocol and subscription management protocol is XML based.

37. A router for use in a content-based network comprising:
   means for matching a document, within a given area, against network subscriptions on ingress to the area; and
   means for explicitly addressing said document to all egress destination routers within said area.

38. A router for use in a content-based network having a plurality of network elements interconnected by links, comprising:
   means for exchanging protocol messages with other routers using a link state protocol;
   means for storing link state information;
   means for exchanging protocol messages with other routers to disseminate subscription information for published content within said content-based network in a manner that is independent of the network topology; and
   wherein said link state subsystem is configured to discover and maintain the network topology information database independently of said subscription management protocol.

39. A method of managing a network having a plurality of network elements interconnected by links, and wherein content from one or more publishers is disseminated to one or more subscribers through said network, said method comprising:
   configuring said network to set up static subscriptions at one or more of said network elements; and
   forwarding published documents through said network in accordance with said static subscription information.

40. The method of claim 39, wherein said static subscriptions are set up through a management interface to permit subscriptions to be specified on behalf of a particular subscriber.

41. The method of claim 39, wherein said network elements comprise content routers, and said static subscriptions are set up on one or more content routers to allow a network administrator to influence the distribution of documents from any particular content router.

42. The method of claim 39, wherein said network elements comprise content routers, said network is divided into distinct network areas separated by gateway routers, and said static subscriptions are set up on one or more links leading to another area whereby a network administrator can influence documents distributed to another area through a said gateway router.

43. A method of managing a content routed network comprising a plurality of content routers interconnected by links, publishers providing content through ingress routers, and subscribers receiving content through egress routers, said method comprising:
   storing at an ingress router subscription information permitting the ingress router to determine which egress routers require any particular incoming document;
   upon receipt of a published document at an ingress router, identifying the egress router or routers requiring said document;
   computing a path or paths to said egress router or routers over said links;
   addressing said published document to said associated egress router or routers; and
   forwarding said published document from said ingress router to said egress router or routers over said computed path or paths.

44. The method of claim 43, wherein said stored subscription information is received from the egress routers.

45. The method of claim 43, wherein when any particular content router receives a document with an address list, said particular content router reads the addresses of the egress routers on said address list, and forwards the document to said egress routers on said address list, whereby is no need for said particular router to examine the contents of said document to perform said forwarding operation.

46. The method of claim 45, wherein when said particular router is on said address list, said particular router examines the content of said document to match said document against a set of local subscriptions for local delivery of said document.

47. The method of claim 46, wherein said forwarding of said document to said egress routers and said matching of said document against said set of local subscriptions happen in parallel.

48. The method of claim 43, wherein when any particular content router receives a document without an attached address list, said particular router matches said document against a network subscription database to determine the set of egress routers that require the document, and then forwards said document to said set of egress routers.

49. The method of claim 48, wherein when said particular router is identified as a router that requires said document, said particular router matches said document against a set of local subscriptions for delivery of said document to local subscribers.

50. The method of claim 43, wherein said network is partitioned into areas interconnected via inter-area links, and wherein when a document is received in one area from another area the document is matched against the network subscription database to determine the set of egress routers that require the document, and said document is then forwarded to the identified egress routers.

51. The method of claim 43, wherein said network is partitioned into areas interconnected via inter-area links, and wherein when a document is received in one area from another area the document is matched against a set of local subscriptions for delivery of said document to local subscribers.

52. The method of claim 43, wherein said path or paths are computed using a link state protocol.

53. The method of claim 43, wherein said subscription information is stored in a content routing information base associating said subscription information with corresponding egress routers.

54. A content router for use in a content routed network comprising a plurality of such content routers interconnected by links, publishers providing content through ingress routers, and subscribers receiving content through egress routers, said content router comprising:
   a content routing information base for storing subscription information identifying which egress routers require any particular incoming document; and
   a processor that is programmed to look up in said content routing information base the egress router or routers requiring a received published document, and to address said document directly to said egress router or routers.

55. The content router of claim 54, wherein said processor is programmed to compute a path or paths to said egress router or routers, and forward said document over said computed path or paths.

56. The content router of claim 54, wherein said processor computes said path or paths using a link state protocol.

57. A content routed network comprising:
   a plurality of content routers;
   one or more publishers attached to said network at an ingress content router; and
   multiple subscribers attached to said network at an egress content router; and wherein each ingress router comprises:
   a content routing information base for storing subscription information identifying which egress routers require any particular incoming document; and
   a processor that is programmed to look up in said content routing information base the egress router or routers requiring a received published document, and to address said document to said egress router or routers.

58. The network of claim 57, wherein said processor is programmed to compute a path or paths to said egress router or routers, and forward said document over said computed path or paths.

59. The network of claim 58, wherein said processor computes said path or paths using a link state protocol.

* * * * *